United States Patent [19]
Adler et al.

[11] Patent Number: 6,138,130
[45] Date of Patent: *Oct. 24, 2000

[54] SYSTEM AND METHOD FOR PROCESSING DATA IN AN ELECTRONIC SPREADSHEET IN ACCORDANCE WITH A DATA TYPE

[75] Inventors: Dan Adler; Roberto Salama, both of New York, N.Y.

[73] Assignee: Inventure Technologies, Inc., New York, N.Y.

[*] Notice: This patent is subject to a terminal disclaimer.

[21] Appl. No.: 09/094,765

[22] Filed: Jun. 15, 1998

Related U.S. Application Data

[63] Continuation-in-part of application No. 08/569,350, Dec. 8, 1995, Pat. No. 5,768,158.

[51] Int. Cl.[7] .................................................. G06F 17/30
[52] U.S. Cl. ........................ 707/503; 707/504; 707/505
[58] Field of Search .................................... 707/503, 504, 707/509, 515, 505; 345/440, 326, 333

[56] References Cited

U.S. PATENT DOCUMENTS

| | | | |
|---|---|---|---|
| 4,750,135 | 6/1988 | Boilen | 709/231 |
| 5,001,654 | 3/1991 | Winiger et al. | 707/529 |
| 5,033,099 | 7/1991 | Yamada et al. | 382/194 |
| 5,055,998 | 10/1991 | Wright et al. | 707/503 |
| 5,060,135 | 10/1991 | Levine et al. | 345/351 |
| 5,208,907 | 5/1993 | Shelton et al. | 707/505 |
| 5,231,577 | 7/1993 | Koss | 707/504 |
| 5,255,363 | 10/1993 | Seyler | 345/507 |
| 5,312,478 | 5/1994 | Reed et al. | 707/503 |
| 5,317,686 | 5/1994 | Salas et al. | 707/503 |
| 5,359,724 | 10/1994 | Earle | 707/205 |
| 5,371,675 | 12/1994 | Greif et al. | 707/503 |
| 5,396,587 | 3/1995 | Reed et al. | 707/503 |
| 5,416,895 | 5/1995 | Anderson et al. | 707/503 |
| 5,416,900 | 5/1995 | Blanchard et al. | 345/346 |
| 5,418,902 | 5/1995 | West et al. | 707/503 |
| 5,428,694 | 6/1995 | Betts et al. | 382/317 |
| 5,437,006 | 7/1995 | Turski | 707/503 |
| 5,553,215 | 9/1996 | Kaethler | 707/503 |
| 5,598,519 | 1/1997 | Narayanan | 707/504 |
| 5,603,021 | 2/1997 | Spencer et al. | 707/4 |
| 5,623,282 | 4/1997 | Graham et al. | 345/121 |
| 5,623,591 | 4/1997 | Cseri | 345/326 |
| 5,657,460 | 8/1997 | Egan et al. | 345/326 |
| 5,734,889 | 3/1998 | Yamaguchi | 395/604 |
| 5,768,158 | 6/1998 | Adler et al. | 364/578 |
| 5,774,121 | 6/1998 | Stiegler | 345/354 |
| 5,799,157 | 8/1998 | Escallon | 705/27 |
| 5,864,871 | 1/1999 | Kitain et al. | 707/104 |
| 5,893,123 | 4/1999 | Tuinenga | 707/504 |
| 5,915,257 | 6/1999 | Gartung et al. | 707/503 |

OTHER PUBLICATIONS

Kurt W. Piersol, "Object Oriented Spreadsheets: The Analytic Spreadsheet Package," *OOPSLA '86 Proceedings*, pp. 385–390 (Sep., 1986).

Marc Levoy, "Spreadsheets for Images," *Computer Graphics Proceedings, Annual Conference Series*, pp. 139–146 (1994).

*Primary Examiner*—Stephen S. Hong
*Attorney, Agent, or Firm*—Hoffman & Baron, LLP

[57] ABSTRACT

An electronic spreadsheet, formed in accordance with the present invention, providing a user with improved data processing capability, includes displaying a visual presentation to the user, the visual presentation including a matrix, the matrix including columns, rows and cells, the cells being formed at intersections of the columns and the rows. The electronic spreadsheet associates objects and formulas with the cells, each object having an object type, each formula receiving an object as an argument, each formula having an operator for operating on the object received as the argument. Further, the electronic spreadsheet evaluates each formula, which includes assigning to the operator in each formula an operative expression selected in accordance with the object type of the object received as the argument of each formula. Still further, the electronic spreadsheet associates a result, obtained during the evaluating procedure, with each cell associated with each formula operating on the object. An additional feature of the invention is that it can be programmed to recognize new data types through user programming or other means. In addition, the invention has been implemented in a client-server computing environment, and in such a way to take advantage of the Java programming environment.

40 Claims, 9 Drawing Sheets

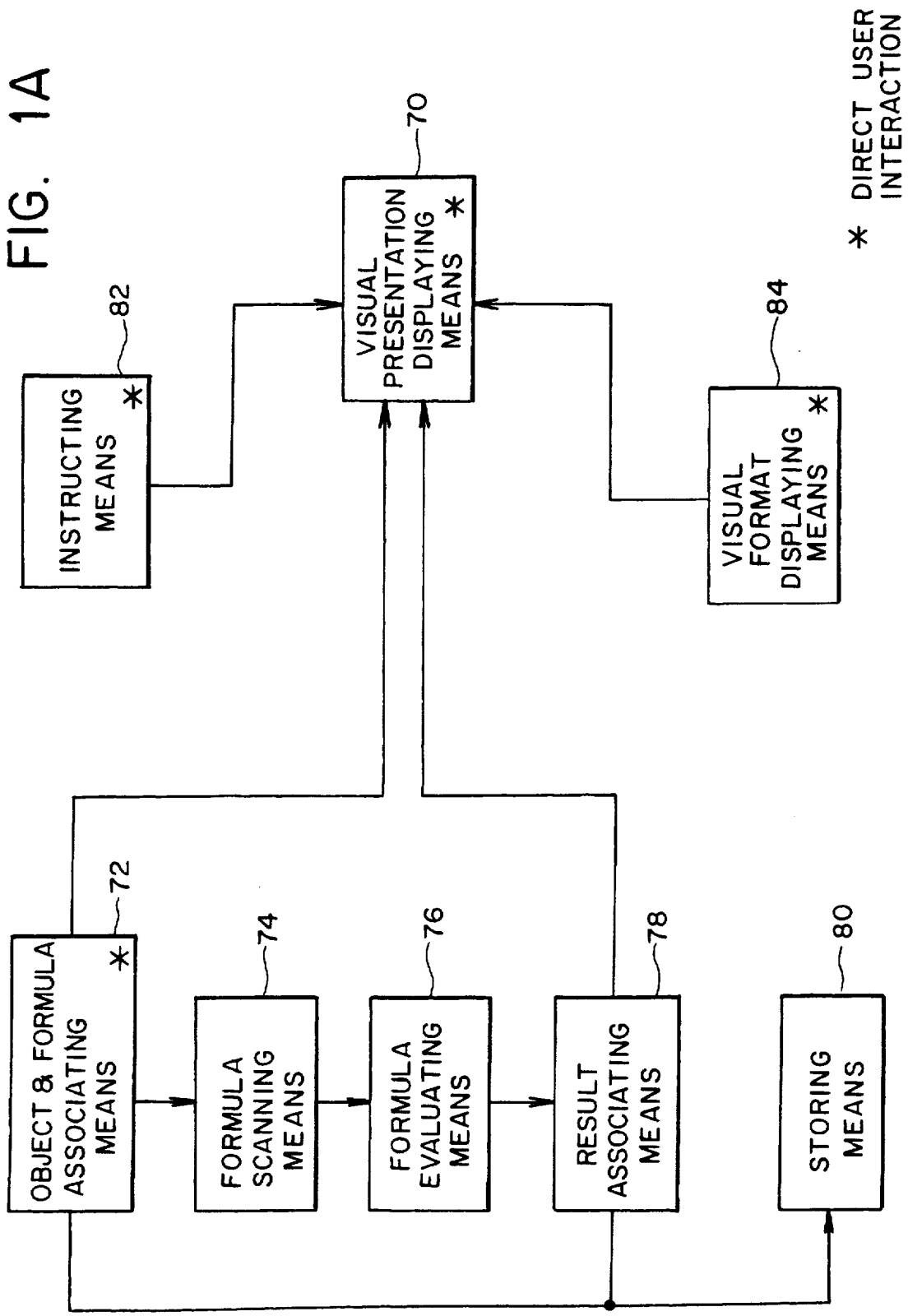

FIG. 3

OMI

File Edit Worksheet Window

= | ( | + | x | > | < | == | AND | Sum | Load Data
(1) | ) | - | ÷ | >= | <= | != | OR | Avg | Com→TS OUT: E7   IN: E7   =Sum(E2:E5)   =f(x)

| | A | B | C | D | E |
|---|---|---|---|---|---|
| 1 | Stock | Num Shares | Buy Price | Last Price | Gain/Lost |
| 2 | IBM | 100 | 87.5 | 98.25 | 1075 |
| 3 | MSFT | 85 | 70 | 96.75 | 2273.75 |
| 4 | SUNW | 125 | 63.4 | 72 | 1075 |
| 5 | AAPL | 200 | 44 | 34.75 | 1850 |
| 6 | | | | | |
| 7 | | | | Total Gain/Lost | 2573.75 |

Values
☐ The last [Default]☐Value of [?]
☐ The [ ] (st/nd/rd/th) Default☐ value of [?] From the Beginning
☐ The [ ] (st/nd/rd/th) Default☐ value of [?] From the End
☐ Date and Time Conditions
☐ Price Transformations

FIG. 7A

Load("ComplexClass" , "rt/libCOMPLEX.so")
Complex_list = \
{{ "complex(1,2)", "complex(2,3)", "complex(4,5)"},\
{ "A1-B1+C1",    "Sum(A1:C1)",   "Avg(A1:C1)"}} x = osh –x0 –w420 –h285 ()
x.list = complex_list

FIG. 7B

// Compile and link with object Engine
// A wrapper for Sun's complex class
class_INIT(complex):
RCObj* cons(OBJECT **o, int n, int id)
[
  .
  // constructor & destructor for complex object
]

static OBJECT *
complex_arith(OBJECT *o1, OBJECT *o2, OPERATOR op)
[
  .
  // Implement all supported operations
]

SYSTEM AND METHOD FOR PROCESSING DATA IN AN ELECTRONIC SPREADSHEET IN ACCORDANCE WITH A DATA TYPE

CROSS-REFERENCE TO RELATED APPLICATIONS

This application is a continuation-in-part of U.S. application Ser. No. 08/569,350, filed on Dec. 8, 1995, which will issue as U.S. Pat. No. 5,768,158.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to computer-based systems and methods for data processing, and more particularly relates to computers and methods utilizing software application programs, particularly spreadsheet application programs.

2. Description of the Prior Art

Generally, spreadsheet application programs are well known in the area of digital computer data processing, such as those disclosed in U.S. Pat. No. 5,416,895 assigned to Borland Inc., U.S. Pat. No. 5,317,686 assigned to Lotus Development Corp., and U.S. Pat. No. 5,359,724 assigned to Arbor Software Corp. These application programs, executed by the processor of a digital computer, typically provide the user with a spreadsheet-like presentation on a cathode ray tube (CRT) display including a grid or chart formed by a series of columns intersecting a series of rows. The intersection of a column and a row forms a cell, into which the user, through the use of computer input and pointing devices, can enter and arrange data. The user may also enter formulas into individual cells that perform operations on the entered data.

Data associated with a cell is called an object and such objects may be in the form of scalar values such as integers, real numbers and strings. Further, objects may be in the form of more complex elements such as video or other graphical images. Nonetheless, the traditional column/row configuration is preferred because such application programs give the spreadsheet user the visual presentation he or she may have become accustomed to from using manual spreadsheets, while at the same time the user is given access to the vast calculating power of the digital computer. Hence, such spreadsheet application programs, being executed on a digital computer, are referred to as electronic spreadsheets.

Still further, certain existing spreadsheets possess the capability of interfacing with a scripting language. The scripting language allows the user to control certain operations and program certain functions into the spreadsheet in an effort to customize the spreadsheet. However, despite the apparent usefulness of these spreadsheet programs, such programs, as well as all other existing spreadsheet programs, suffer from certain inherent limitations. These limitations include, for instance, a lack of flexibility with respect to the types of objects that can be manipulated, a lack of extensibility with respect to customization of spreadsheet operators and functions, and a restriction on the presentation of data associated with each object.

As mentioned, lack of flexibility with respect to the types of objects that can be manipulated is one disadvantage of prior art electronic spreadsheets. For instance, it is frequently desirable to perform an operation involving the comparison of like data elements corresponding to two different sets of data. Many existing electronic spreadsheets have the ability to perform this operation; however, in so doing, each element of each data set must typically be assigned to an individual cell, and depending on the size of the data sets, this approach may consume a multitude of spreadsheet cells. Additionally, the resultant data elements generated from the comparison must be assigned to individual cells, making the entire operation extremely cumbersome and space-consuming. This disadvantage exists regardless of whether the electronic spreadsheet is two dimensional, i.e., capable of displaying one spreadsheet, or multidimensional, i.e., capable of displaying multiple interrelated spreadsheets.

Nonetheless, even in an existing electronic spreadsheet capable of assigning an entire data set to an object in one cell, lack of extensibiltiy with respect to the customization of spreadsheet operators and functions still limits the efficiency of these prior art spreadsheets. Lack of extensibility of existing electronic spreadsheets is best illustrated in view of the rigid operation of the data calculation engines associated with these spreadsheets. A data calculation engine is a software module that performs the cell operations associated with an electronic spreadsheet.

For instance, if a user inputs a first scalar value into a first cell of the spreadsheet, a second scalar value into a second cell of the spreadsheet, and desires a third cell of the spreadsheet to represent the addition of the values in the first and second cell, the data calculation engine will perform the scalar addition operation and provide the electronic spreadsheet with the scalar result. It is possible for the data calculation engine to perform this operation because such an operation is "hard-wired" into the module's repertoire of available cell operations. However, because complex objects such as databases (i.e., large data sets) can occupy a single spreadsheet cell, operations between these complex objects are not possible unless the data calculation engine was originally programmed to understand the nature of the complex object, and further, programmed to perform specific operations thereupon. Therefore, while existing electronic spreadsheets provide users with a scripting language that may allow them to manipulate objects to be placed in cells, the existing spreadsheets do not allow the user to alter basic operations on these objects nor do they allow the creation of new objects.

Still further, existing electronic spreadsheets are restricted in the manner in which data associated with an individual cell can be visually formatted and presented. Referring back to the manipulation of the two data sets, discussed above, traditional spreadsheet programs are limited to presenting each element of each data set in an individual cell, forcing the user to scroll through the columns and rows of the spreadsheet in order to locate one particular element of the data set. Therefore, no method is provided for the user to manipulate the data and view it in a more useful format, such as a chart, a graph or a histogram.

Other computer-based data processing systems have attempted to exploit the functionality of an electronic spreadsheet and at the same time overcome some of these limitations. Such systems include the electronic spreadsheets disclosed by Kurt W. Piersol in "Object Oriented Spreadsheets: The Analytic Spreadsheet Package", OOPSLA 1986 Proceedings (September 1986) and by Marc Levoy in "Spreadsheets for Images", Computer Graphics Proceedings, Annual Conference Series (1994). While the Piersol article discloses an object-oriented electronic spreadsheet, the Piersol spreadsheet possesses a fundamental restriction in that operations in cells are not permitted to alter the value of other cells. The spreadsheet described by Levoy discloses the ability to manipulate complex objects such as graphical images; however, the spreadsheet and its scripting language are geared mainly toward manipulating such graphical objects and therefore do not provide the spreadsheet user with the ability to perform traditional arithmetic operations customary in spreadsheet applications.

OBJECTS AND SUMMARY OF THE INVENTION

It is an object of the present invention to provide a computer-based system for improved data processing.

It is another object of the present invention to provide a computer-based system for improved data processing including an electronic spreadsheet which includes a user-definable visual presentation that functions as a front-end to a scripting language, the scripting language operating both as a flexible data calculation engine and an interactive programming environment.

It is yet another object of the present invention to provide a computer-based system for improved data processing including an electronic spreadsheet that can be used in the field of financial market analysis, and in particular, in the analysis and manipulation of complex data objects that represent historical or static representations of different types of financial instruments.

It is a further object of the present invention to provide a computer-based system for improved data processing including an electronic spreadsheet that is extremely flexible with respect to the types of objects that can be operated on, as well as the types of operations permitted.

It is still a further object of the present invention to provide a computer-based system for improved data processing including an electronic spreadsheet which utilizes polymorphic operators, that is, operators performing different operations depending upon the type of object being operated on.

It is yet another object of the present invention to provide a computer-based system for improved data processing including an electronic spreadsheet that is extensible with respect to the customization of spreadsheet objects, operators and functions, and which can be deployed on a variety of different operating systems or computing environments, including, in particular, a client-server computer environment.

It is also an object of the present invention to provide a computer-based system for improved data processing in which the functionality of the system is deployed in a single computer system, through a server computer system in a client-server computing environment, through a client computer system in a client-server computing architecture, or in any combination thereof.

It is also an object of the present invention to provide a computer-based system for improved data processing that can operate and analyze data objects that are retrieved from databases or storage devices maintained at a remote location and that are accessible through a variety of network environment means, including local area networks, wide area networks or the Internet.

It is still a further object of the present invention to provide a computer-based system for improved data processing including an electronic spreadsheet that permits the user to select the manner in which data associated with a particular object will be viewed.

It is yet another object of the present invention to provide a method for improved data processing including the use of an electronic spreadsheet which includes a user-definable visual presentation that functions as a front-end to a scripting language, the scripting language operating both as a flexible data calculation engine and an interactive programming environment.

Another object of the present invention is to provide a computer-readable medium containing computer program code that, when used in conjunction with a general or special purpose computer, will yield a computer-based system for improved data processing as described herein.

It is a further object of the present invention to provide an executable computer program code that can implement the functionality of the disclosed invention in a variety of computing environments using the Java programming language and architecture.

The present invention provides a computer-based data processing system that is more flexible and more extensible than all existing computer-based data processing systems. Particularly, the computer-based data processing systems of the present invention includes an electronic spreadsheet being executed by a digital processor, the processor being part of a digital computer. It is to be appreciated that the electronic spreadsheet of the present invention may be embodied on a floppy disk or on any other type of memory storage media (i.e., including both fixed and removable media) known to persons skilled in the art. The electronic spreadsheet, formed in accordance with the present invention, permits the user to input and manipulate data, through the use of standard computer input and pointing devices (i.e., keyboard, mouse, trackball, joystick, touchscreen, etc.), or through means which retrieve data from data storage devices accessible through a computer network, and to view the results of the data processing performed by the electronic spreadsheet, through the use of a standard CRT display.

The electronic spreadsheet can utilize data that is provided via a computer readable file stored locally on a computer storage medium associated with the computer system, as well as data that is accessible through a network environment.

Further, the electronic spreadsheet of the present invention includes a user-definable visual presentation that functions as a front-end to an object-oriented extensible software scripting language. The scripting language uniquely functions as both a software command interpreter and a powerful data calculation engine. Accordingly, the user of the electronic spreadsheet, with its unique scripting language and accompanying facilities, is given the capability of extending the functionality of the spreadsheet in an object-oriented manner. Particularly, the user is able to program new types of objects into the interpreter, define the operations that can be performed on these objects, and then immediately utilize these objects in the context of the electronic spreadsheet.

In short, the computer-based data processing system of the present invention functions in a manner opposite to all existing computer-based data processing systems. This fundamental difference exists because, while existing electronic spreadsheets provide users with the facilities to generate custom scripts (i.e., combinations of commands recognized by the spreadsheet which manipulate existing objects), the electronic spreadsheet of the present invention not only allows the user to perform that function, but also allows the user to create new objects and alter the basic operations permissible on those objects. In a functional sense, scripting languages associated with existing spreadsheets can be thought of as being functionally "in front of" the spreadsheet, in that the user can only manipulate objects on the spreadsheet that the spreadsheet allows the user to manipulate. Whereas, the scripting language of the present invention is functionally "behind" the spreadsheet, thereby allowing the user to control the very essence of the objects and operations that comprise the electronic spreadsheet.

In accordance with one form of the present invention, a computer-based system for data processing having a digital processor and input means (i.e., including both input and pointing devices) coupled to the digital processor, and a display unit responsive to the digital processor, where the system is responsive to objects and formulas, includes at least one visual presentation displayed on the display unit and computer processing means which includes software and/or hardware. It is to be appreciated that the software operations associated with the computer processing means are performed by the software associated with the electronic spreadsheet of the present invention, as described herein. The at least one visual presentation displayed on the display unit by the digital processor includes a cell field. The cell field includes cells that are positioned in a column/row format. The at least one visual presentation also includes a text edit field. The text edit field receives the objects and the formulas entered by the user through the input means. Each object has an object type, while each formula has at least one object as an argument and at least one operator for operating on the at least one object.

The invention can also be implemented in a client-server computing environment. In such an environment, computer systems are linked through a computer network that permits the computer systems to exchange data. Computer systems designated as "client" computer systems primarily function as the interface to users of the system. Such client computers may also perform operations or computations upon data in accordance with the teachings of this disclosure. Computer systems designated as servers primarily function to retrieve data and perform evaluations or re-evaluations of formulae upon such data, and to transmit results of these operations to designated client computer systems or other server computer systems. Server computers also generally are subject to the control of a user via a client computer. It is to be emphasized that any combination of elements of the data processing system described herein can be implemented using any combination of client and server computer systems, in accordance with the teachings of this disclosure.

The computer processing means correspondingly associates each object and each formula with each cell and correspondingly evaluates each formula and assigns to the at least one operator in each formula one of a plurality of operative expressions selected in accordance with the object type of the at least one object received as the argument of each formula. The computer processing means associates a result of each formula with each cell containing each formula operating on the at least one object.

The computer processing means of the computer-based system formed in accordance with the present invention also preferably includes means for re-evaluating each formula if a value within the at least one object changes and means for re-associating the result of each formula with each cell containing each formula operating on the at least one object whose value has changed.

The visual presentation of the computer-based system formed in accordance with the present invention also preferably includes a query window. The query window receives user-provided responses corresponding to English sentence-style predefined questions, the query window forming a formula in accordance therewith. Further, the visual presentation preferably includes a user-selected cell. The computer processing means associates the formula formed by the query window with the user-selected cell. The computer processing means evaluates the formula and associates a result of the formula with the user-selected cell.

The computer processing means of the computer-based system formed in accordance with the present invention preferably includes means for storing each object and each formula associated with each cell. Where the system is implemented in a client-server computer system environment, the means for storing each object and each formula associated with each cell may be a computer memory or storage device that is part of the client computer system or the server computer system, or both. Further, the computer processing means preferably includes means for scanning each formula to ensure that each formula conforms to a preferred cell reference syntax. The computer processing means also preferably includes means for translating each formula, not in conformity, to the preferred cell reference syntax.

Still further, the computer processing means preferably displays, within the visual presentation, at least one of each object and the result of each formula in one of a plurality of visual formats. Preferably, the plurality of visual formats are user-selectable.

The computer-based system, wherein the user identifies a user-selected cell through the input means and enters at least one character into the text edit field through the input means, also preferably includes a memory storage unit. The memory storage unit is responsive to the computer processing means and contains data signals corresponding to data associated with an object. The memory storage unit may be associated with either a client computer system or a server computer system. The computer processing means also preferably includes means for correlating the at least one character with the data associated with the object and thereby associates the data with the user-selected cell.

In accordance with another form of the present invention, a computer-based system for data processing includes means for displaying a visual presentation to a user. The displaying means may be implemented in a hardware/software configuration with the hardware including, for example, a CRT display. It is to be appreciated that the visual presentation is displayed to the user in response to signals generated by the present invention. Further, these signals correspond to user input signals as well as other data and control signals processed by the present invention. As previously mentioned, the displaying means may include a CRT display which presents the user with a spreadsheet-like visual presentation having at least one matrix, the matrix including columns, rows and cells. The cells of the matrix are defined by the intersection of the columns and the rows. The system also includes means for associating objects and formulas with the cells. This associating means may be implemented in a hardware/software configuration, with the hardware including, for example, the use of computer input and pointing devices. Each object, defined previously as data associated with a cell, is itself defined by an object type. Object types can be simple, such as scalar values including integers, real numbers and strings. Object types can also be complex, including but not limited to such object types as lists, databases, and other multi-element objects.

Where the data processing system is deployed in a client-server computing environment, it is preferable that computer program code that is executed on the server provide the capability for the server computer system to retrieve and act upon the data objects, while the client computer serves as the means for controlling the operations of the server computer system. In addition, in such an embodiment, the server-based components of the data processing system can be deployed in a manner which omits visual presentation means and user input signal and control means, said visual presentation and user input signal and control means being provided through the client computer system. In this embodiment of the present invention, the server computer system will perform calculations or other manipulations of data, generate data corresponding to a visual representation of data or of program control elements of the system that are then sent to a client computer system, where said client computer system processes the data to yield a visual representation comprising a cell field and a text edit field.

The electronic spreadsheet of the present invention, in a preferred embodiment, may be used in the field of financial market analysis. In such a case, the electronic spreadsheet may process signals corresponding to complex financial market objects, such as objects having object types referred to as Timeseries, real-time Timeseries, Options and Commodities. These complex financial market objects are merely complex sets of data elements arranged in different formats and relating to different financial market trading instruments. The various types of complex data objects may include data that represents the value of a financial instrument at a fixed date and time, data that defines the date and time of such valuation, and data that permits conversion of the data representing the valuation of the financial instrument into different currency values. Regardless of the object type, each formula associated with a cell receives at least one object as an argument and has at least one operator for operating on that object.

The system also includes means for evaluating each of these formulas which includes assigning one of a plurality of operative expressions to the operator in the formula. The evaluating means may be implemented in a hardware/software configuration, with the hardware including, for example, the digital processor of a digital computer. The digital processor may be an element of a client computer system or a server computer system where the data processing system is deployed in a client-server environment.

Accordingly, any one operator may have several different operative expressions assigned to it, the assignment depending on the type of object or objects being operated on. Such polymorphic, or overloaded, operators add a unique dimension to the electronic spreadsheet of the present invention. The system also includes means for associating a result, obtained from the evaluation of the formula, with the cell which has the formula associated therewith. It is to be appreciated that this associating means may also be implemented in a number of hardware/software configurations, irrespective of whether such hardware or software elements are associated with a single computer-based system, or are implemented in a client computer system or a server computer system that are part of a client-server computing environment.

In another preferred embodiment of the present invention, the evaluating means of the computer-based system are implemented on a server computer system as part of a client-server computing architecture. In such an embodiment, the server computer-system will include means for retrieving and acting upon data, whether the data source is a local storage device associated with the server computer system or a data storage device or system accessible through a network, said network including a local area network, a wide-area network or the Internet.

The evaluating means of the computer-based system for data processing of the present invention preferably includes means for re-evaluating each formula if a value within an object, that is being operated on by that formula, subsequently changes. The re-evaluating means may be implemented in a hardware/software configuration similar to the evaluating means previously mentioned, whether through a single computer environment, or through a server computer system or a client computer system element of a client-server computing system.

In a preferred embodiment, as an example, a formula operating on a real-time Timeseries, such as a set of stock-related data being updated by a real-time stock market data feed, will automatically be re-evaluated and the updated result re-associated with the cell holding the formula. Where the data-processing system has been implemented in a client-server environment, the formula re-evaluation process can be performed by a server computer, with the result from said re-evaluation being distributed to designated client computer systems that are part of the client-server computer system.

The data processing system of the present invention also preferably includes the capability to have each cell exhibit a different visual appearance, depending on the object type of the object associated therewith. The different visual appearance preferably includes a difference in color.

In another embodiment of the present invention, the means for associating objects and formulas with cells also preferably includes means for generating each formula from a user-interactive English sentence-style query window as previously mentioned, the query window being available to the user directly in the electronic spreadsheet. This generating means may be implemented in a hardware/software configuration, with the hardware including, for example, input and pointing devices. The query window receives signals representing user-provided responses corresponding to pre-defined questions, processes the response signals received, and generates a formula therefrom. It is to be appreciated that the formulas created through the query window may include the performance of a function on a single object.

In a further embodiment, the computer-based system for data processing preferably includes means for storing signals corresponding to each object and each formula associated with each cell. The storing means may be implemented in a hardware/software configuration, with the hardware including, for example, local memory associated with a digital processor and/or a memory storage unit. The memory storage unit is preferably resident in the digital computer. Where the data processing system is implemented in a client-server environment, the storing means for said signals and formula associated with each cell may comprise a memory storage unit that is part of a client computer system or a server computer system, or both.

The data processing system of the present invention preferably includes means for scanning each formula to ensure that each formula conforms to a preferred cell reference syntax, such preferred cell reference syntax being processable by the system. The scanning means also preferably translates each formula, if non-conforming, to the preferred cell reference syntax. It is to be appreciated that the scanning means may be implemented in a hardware/ software configuration, with the hardware including, for example, the digital processor of a digital computer.

The data processing system preferably includes means for instructing the system to recognize new objects and new operators. The instructing means may be implemented in a hardware/software configuration. Preferably, the user, in conjunction with the hardware (i.e., input and pointing devices) and software, adds new objects and new operators to the system. Thus, the instructing means is preferably user-programmable and further, employs a C-programming language-type syntax. This syntax corresponds to either a C or a C++ compiler. Alternatively, the instructing means may employ other programming languages, preferably object-oriented programming languages including Java. Still further, the instructing means preferably includes integration of new objects selected from an external object library. The external object library may be provided through existing industry-defined object model environments, particularly those defined via the Java programming language and environment. The ability of the present invention to extend the types of objects and operators recognized by the system, through user-programming, provides limitless flexibility to any user of the electronic spreadsheet. Further, the fact that many commercial vendors are now providing C++ and Java class libraries which include various business objects and which are available by remote download over a computer network, allows immediate access to the new objects by the electronic spreadsheet user.

Another preferred embodiment of the invention involves implementing the data processing system in a client-server computing environment using the Java programming language. In such an embodiment, various features of the system may be distributed among different client or server computer systems. For example, the visual presentation features comprising a cell field and at least one text edit field may be implemented in a client computer system through a native call to the operating system of said client computer system or through a world wide web browser capable of rendering displays of said presentation elements. Another feature of this manner of implementing the invention is that any data object defined through an appropriate Java class can be made available and used by the data processing system described herein.

In a further embodiment of the present invention, the means for associating objects and formulas with cells also preferably includes means for loading data signals from a memory storage unit, the data signals corresponding to data associated with an object. In this particular embodiment of the loading means of the present invention, the user enters a name into a cell, the name being associated with a data file stored in a memory storage unit. The memory storage unit may or may not reside in the digital computer. In particular, the data file may be stored in a computer system accessible by a computer network, including a local area network, a wide-area network or through the Internet. The system retrieves the data file, and in treating it like an object, associates the data therein with the cell containing the entered name. Accordingly, formulas operative on that particular cell will thereby operate on the data associated with that cell.

The computer-based system for data processing also preferably includes means for displaying the objects, and/or the results obtained from the evaluation of formulas, in one of a plurality of visual formats within the visual presentation. The visual format displaying means may be implemented in a hardware/software configuration, with the hardware including, for example, a CRT display. The user is given the ability to select the particular visual format that is most desirable. Such visual formats available preferably include graphs, charts, histograms or any other manner of presenting the data associated with an object or formula result in an easily-readable and informative style.

A method of data processing performed in accordance with the present invention, that utilizes a computer-based system for data processing, includes the step of displaying a visual presentation to a user, the visual presentation including at least one matrix, the matrix including columns, rows and cells, the cells being formed at the intersections of the columns and rows. The method also includes the step of associating objects and formulas with cells, each object having an object type, each formula receiving at least one object as an argument, each formula having at least one operator for operating on the at least one object received as the argument. Further, the method of data processing includes the step of evaluating each formula and thereby assigning one of a plurality of operative expressions to the at least one operator in each formula. The operative expression is selected in accordance with the object type of the at least one object received as the argument of each formula. Still further, the method includes the step of associating a result, obtained during the evaluating step, with each cell associated with each formula operating on the at least one object. The evaluating step may also include re-evaluating each formula if a value within the at least one object is changed.

Where the data processing method described in the preceding paragraph is implemented in a client-server computing environment, it is preferable that the visual presentation steps are performed by a client computer system. In such an embodiment, it is preferred that the associating and evaluating steps be performed by the server computer system. It is emphasized that any of the steps of the process may be performed by the client computer system in such an environment.

The method of data processing of the present invention preferably includes the step of instructing the computer-based system to recognize new objects and new operators. The instructing step preferably includes user-programming, the user–programming employing a C-programming language-type syntax or the Java syntax programming language and environment. Further, the new objects of the instructing step may also be selected from an external object library, as previously described.

Still further, the method of data processing preferably includes the step of displaying the objects, and/or the results from the evaluation of the formulas, in one of a plurality of visual formats within the visual presentation. Such visual formats are also preferably user-selectable.

Previously, computer-based systems for data processing included electronic spreadsheets with scripting languages which were functionally "in front of" the spreadsheet, thereby limiting the user to the operations "hard-wired" into the data calculation engine of the system. Surprisingly, it has now been discovered that a computer-based system for data processing can provide unique benefits by functionally positioning the scripting language "behind" the spreadsheet. Hence, the user may not only define objects but may also alter the basic operations permitted by the spreadsheet on those objects. Further, the present invention provides the unique advantage of assigning one of a plurality of operative expressions to each individual operator, depending on the object type of the object or objects being operated on, thereby providing flexibility, previously unavailable, to the user to easily manipulate both simple and complex objects.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1a is a simplified block diagram of another form of a computer-based system for data processing formed in accordance with the present invention.

FIG. 3 is another embodiment of a visual presentation formed in accordance with the present invention.

FIG. 7a is an example of a source code file associated with the creation of a new user-defined object.

FIG. 7b is an example of a script file associated with the creation of a new user-defined object.

DETAILED DESCRIPTION OF THE PREFERRED EMBODIMENTS

Figure 1:
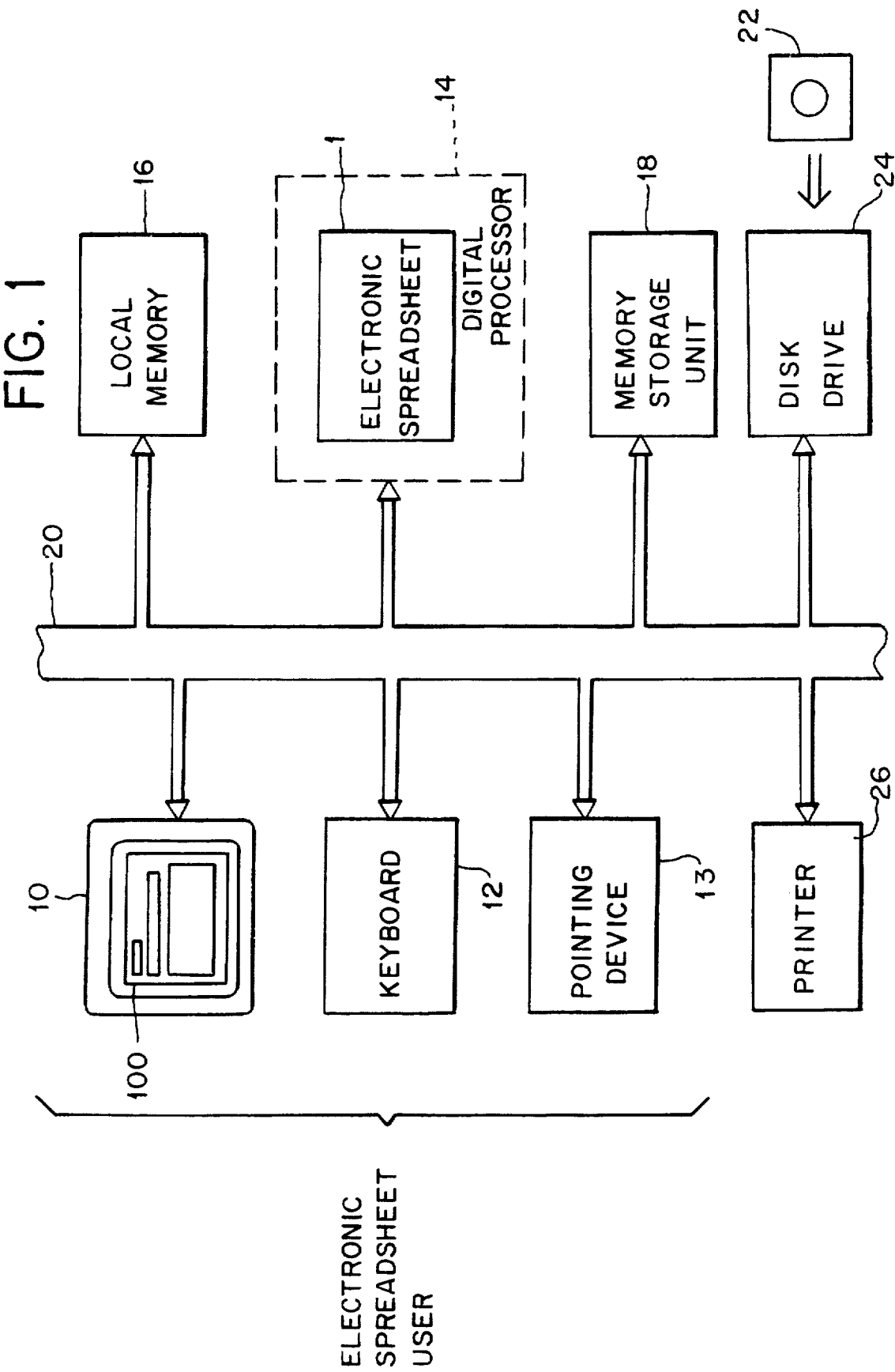
FIG. 1 is a simplified functional block diagram of a computer-based system for data processing formed in accordance with the present invention.

Referring initially to FIG. 1, a simplified functional block diagram of a computer-based system for data processing, formed in accordance with the present invention, is illustrated. In general, the present invention may be implemented in software and embodied on a floppy disk 22 read by a disk drive 24, which software loaded into the computer is depicted as an electronic spreadsheet 1, and executed by the computer system illustrated in FIG. 1. The computer system is composed of a CRT display 10, a keyboard 12, a pointing device 13, a digital processor 14, a local memory 16, a memory storage unit 18 and the disk drive 24 mentioned previously. The computer system may also include a printer 26. The various system components of the computer system are operatively coupled and communicate via a system bus 20, or some similar architecture.

Further, it is to be appreciated that the computer system, illustrated in FIG. 1, is merely representative of one form of a computer system capable of embodying the electronic spreadsheet of the present invention. Thus, many alternative embodiments of the computer system are anticipated by the present invention. For instance, the electronic spreadsheet may be executed on a single computer workstation or simultaneously executed on multiple computer workstations cooperatively coupled and operating via a computer network.

Thus, where the system is implemented in a client-server computing environment, elements 10, 12, 13 and 16 of FIG. 1 may be elements associated with the client computer system, while elements 16, 1, 14, 18 and 24 may be elements associated with the server computer system. Other combinations of elements of computer systems can be utilized to implement the data processing system and derive from conventional ways of implementing a client-server computing environment.

Further, it is to be understood that the individual system components may vary in type, while still providing similar functionality. For instance, the pointing device 13, used to position a display cursor and select certain functions and items displayed on the CRT display, may be in the form of a mouse, trackball, or touchscreen. However, in a preferred embodiment, the user is provided with a keyboard 12 for data entry and a mouse as the pointing device 13.

Nonetheless, the electronic spreadsheet 1 of the present invention is loaded from the memory storage unit 18, which may or may not be physically resident in the computer system (i.e., may be remotely located with respect to the computer system but operatively coupled via a separate data bus or through a computer bus network), and executed by the digital processor 14 in conjunction with the local memory 16 and the memory storage unit 18. Further, the CRT display 10 displays a visual presentation 100, associated with the electronic spreadsheet of the present invention, to the electronic spreadsheet user, while keyboard 12 and pointing device 13 provide the user with data entry and manipulation capabilities.

Referring now to FIG. 1a, a simplified block diagram of another embodiment of a computer-based system for data processing, formed in accordance with present invention, is illustrated. It is to be appreciated that this particular embodiment is implemented in a hardware/software configuration and includes visual presentation displaying means 70, object and formula associating means 72, formula scanning means 74, formula evaluating means 76, result associating means 78, storing means 80, instructing means 82, and visual format displaying means 84. It should be understood that the functions associated with each block may be implemented in hardware and/or software; however, in this particular preferred embodiment, the system is implemented in a hardware/software configuration where the software operations are performed by the software associated with the electronic spreadsheet of the present invention, as described herein.

In addition, the functions associated with each block may be implemented and executed by discrete computer systems, where, for example, the data processing system is implemented in a client-server computer environment. In one an example, the visual presentation displaying means 70 and the visual format displaying means 84 are associated with a client computer system, while the object and formula associating means 72, the formula scanning means 74, the formula evaluating means 76, the result associating means 78, the storing means 80, and the instructing means 82 are elements of a server computer system.

Accordingly, the visual presentation displaying means 70 includes a CRT display as well as the software of the present invention responsible for generating or displaying the spreadsheet-like visual presentation to the user. The software for generating a spreadsheet-like visual representation may be resident on either a client computer system or a server computer system where the invention is deployed in a client-server environment. In such a situation, the server computer may generate data corresponding to the visual presentation and send said data via a network to a client computer system, or these functions may be implemented by the client computer system alone.

The user directly interacts with the present invention via the visual presentation displayed on the CRT display and by utilizing the keyboard 12 (FIG. 1) and pointing device 13 (FIG. 1). The object and formula associating means 72, which includes the keyboard 12 and pointing device 13 in cooperation with the software of the present invention, allows the user to enter objects and formulas into the system and have the objects and formulas be associated with a cell or cells within the visual presentation (as will be described in detail later) in accordance with the user's preference.

It is to be appreciated that the object and formula associating means 72 also includes means for generating each formula from a user-interactive English sentence-style query window which will be described later in greater detail. Also, the associating means 72 includes means for loading data signals corresponding to data associated with an object. The loading means includes the memory storage unit 18 (FIG. 1) in cooperation with the software of the present invention. As will be described later, the user can load data associated with an object into a cell or cells simply by entering a name associated with that particular object.

The source of the data may be a computer memory or storage device that is part of the computer system, or may be a remote database computer system accessible through a computer network such as a local area network, a wide area network or the Internet. The loading means may be implemented as part of a client computer system or a server computer system where the data processing system has been implemented in a client-server computing environment.

Next, the formula, associated with a cell through the associating means 72, is scanned by formula scanning means 74. The scanning means 74 includes the digital processor 14 and local memory 16 in cooperation with the software of the present invention. The scanning means 74 scans each formula to ensure that each formula conforms to a preferred cell reference syntax and translates each formula, not in conformity with such syntax, into such a syntax so that the formula can be processed by the system. The preferred cell reference syntax will be described later in detail with regard to the internal implementation of the present invention. The formula scanning means may be implemented as part of a client computer system or a server computer system where the data processing system has been implemented in a client-server computing environment.

Next, the formula evaluating means 76, which includes the digital processor 14 and the local memory 16 in cooperation with the software of the present invention, evaluates each formula and generates a result. The evaluating means 76 assigns a functional meaning (i.e., operative expression) to the operators in each formula in accordance with the object type of the object being operated on by each formula. Thus, the operators contained in each formula are said to be polymorphic or overloaded. It is to be appreciated that the formula evaluating means 76 also includes means for re-evaluating each formula if a value within an object, being operated on by a particular formula, changes. The formula evaluating means 76 may be implemented as part of a client computer system or a server computer system where the data processing system has been implemented in a client-server computing environment.

The result associating means 78, which also includes the digital processor 14 and local memory 16 in cooperation with the software of the present invention, associates the formula result from the formula evaluating means 76 with a cell or cells within the visual presentation. The result associating means 78 may be implemented as part of a client computer system or a server computer system where the data processing system has been implemented in a client-server computing environment.

Both the object and formula associating means 72 and the result associating means 78 interact with the visual presentation displaying means 70, in that, any objects and formulas entered by the user and results corresponding to the formulas are processed by the visual presentation displaying means 70 and respectively displayed to the user. The interaction between the object and formula associating means 72 and the result associating means 78 on the one hand, and the visual presentation displaying means 70 on the other hand, may be effected through an operative linkage via a system bus where the means are components of a single computer system. Alternatively, where the object and formula associating means 72 and the result associating means 78 are components of a server computer system, and the visual presentation displaying means are a component of a client computer system, the interaction can be effected through any method of transmitting data within or through a computer network.

Further, storing means 80, which includes the digital processor 14, the local memory 16 and the memory storage unit 18, in cooperation with the software of the present invention, is responsive to the object and formula associating means 72 and the result associating means 78, and stores (i.e., saves) the formulas and their respective results in memory. The storing means 80 may save the formulas and results in volatile (local memory 16) or non-volatile (memory storage unit 18) memory, depending on the application.

In addition, where the data processing system has been implemented in a client-server computing environment, the storing means may be a component of a server computing system or a client computing system, or both.

Instructing means 82, which includes the user utilizing the hardware as illustrated in FIG. 1 in cooperation with the software of the present invention, allows the user to instruct the system to recognize new objects and new operators, the new objects and new operators being created via user-programming in a C-language-user-programming. For example, programming languages that use a C-language-type syntax could be used to generate new objects or operators that would be recognized by the system. Alternatively, objects and operators created or accessible as a result of implementing the invention using the Java programming language and environment could be a means of type syntax and/or being supplied enabling the data processing system to recognize new objects and operators. A Java implementation of the invention is only one example of a way to supply new objects or operators from an external object library. An example of the operation of the instructing means will be illustrated in connection with FIGS. 7a and 7b.

Lastly, visual format displaying means 84, which includes the CRT display in cooperation with the software of the present invention, allows the user to display objects and/or results obtained from the evaluation of formulas in a variety of visual formats such as graphs, charts and histograms. The visual format displaying means 84 gives the user the ability, through the pointing device 13, to choose a preferred visual format.

Accordingly, the operation of the electronic spreadsheet, formed in accordance with the present invention, will now be described in further detail.

Figure 2:
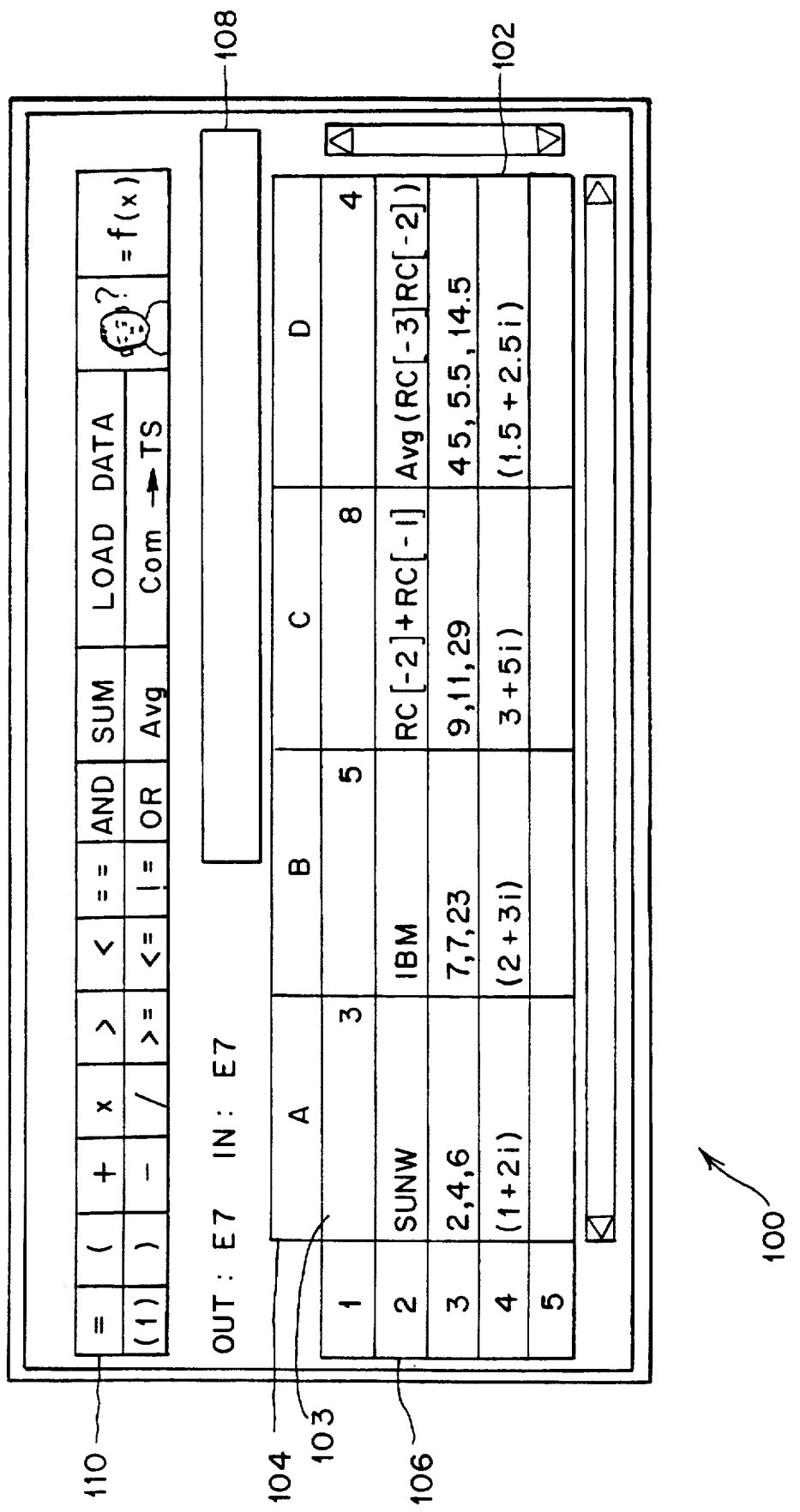
FIG. 2 is one embodiment of a visual presentation formed in accordance with the present invention.

Referring now to FIG. 2, the visual presentation 100 associated with the electronic spreadsheet of the present invention, is illustrated. The visual presentation 100 is presented to the spreadsheet user via a CRT display 10 (FIG.

1). The visual presentation 100 is basically composed of several user-interactive fields including, a cell field 102, a column reference designation field 104, a row reference designation field 106, a text edit field 108, and a f-unction button field 110.

It is to be appreciated that other similar visual presentations may be generated by the present invention; however, this particular visual presentation 100 illustrates a general layout and is used to more clearly explain the user-interactive features of the present invention. Thus, it is to be understood that modifications (i.e., deletions and additions) to this visual presentation are anticipated by the present invention, and will be discussed accordingly throughout this detailed description. For instance, the visual presentation may also include a pull-down menu field and a query window field. These additional fields will be discussed in the context of a later example of the present invention. Further, it is to be understood that the present invention provides multidimensional capability to the user allowing him to create multiple visual presentations and perform interrelated operations with respect to cells and formulas contained on these multiple visual presentations.

In a preferred embodiment of the present invention, the electronic spreadsheet user utilizes the visual presentation 100 along with a keyboard 12 (FIG. 1) and a mouse as the pointing device 13 (FIG. 1). Thus, the following standard kinds of facilities are employed throughout this detailed description and, therefore, are defined herein:

Selecting—by positioning a display cursor associated with the CRT display on a desired item (e.g., cell) in the visual presentation and clicking (depressing and then releasing a button on) the mouse, the desired item is identified or selected.

Dragging—by positioning the display cursor on a desired item and depressing the mouse button, holding the mouse button down and moving the mouse in order to correspondingly move the display cursor to another location, responsively, the desired item is moved from its original location to the new location of the display cursor.

Double Clicking—by clicking twice in rapid succession while the display cursor is positioned on an item, a predetermined operation on that item is executed.

Inputting Data—by selecting a menu option or an area designated to receive user input and typing on the keyboard, the desired data is input to the displayed visual presentation.

With these basic facilities defined, the unique features of the electronic spreadsheet of the present invention will now be described. Cell field 102 is composed of a number of individual cells, each cell in a preferred embodiment being exact in size and shape to cell 103. Each cell is identified by a column reference designation and a row reference designation. These reference designations are illustrated in column reference designation field 104 and row reference designation field 106, respectively. Accordingly, cell 103 is identified as A1, which derives from the fact that the cell is located at the intersection of column A and row 1. Each of the individual cells in the cell field is identified in a similar manner. It is to be appreciated that this method of identifying cells is standard in traditional spreadsheets, as well as in prior art electronic spreadsheets and, thus, is employed to facilitate the spreadsheet user establishing a familiarity with the present invention. It is also to be appreciated that the cell field 102 displays only a small portion of the cells that can be displayed and manipulated by the electronic spreadsheet. Thus, a user may scroll the cell field horizontally (revealing previously undisplayed columns) or vertically (revealing previously undisplayed rows).

As stated previously, each cell may be associated with (i.e., contain) an object or a formula which is operative on one or more objects. Each object has a corresponding object type which can be simple or complex. Such simple object types may be scalar values including integers, real numbers and strings, while such complex object types may include representations in data of financial market instruments such as Timeseries, real-time Timeseries, Options and Commodities. Such complex data objects comprise a variety of scalar and non-scalar values that represent characteristics of the financial market instrument that is the subject of the data representation.

Accordingly, in a preferred embodiment of the present invention, a different color is associated with a particular cell depending on the object type associated therewith. For example, a cell having a Timeseries associated therewith is shaded in green, while cells with scalar values are blue, and cells with Commodities are gold. This unique method of visually color coding each cell allows the electronic spreadsheet user to quickly determine what object type is associated with a particular cell. However, it is to be appreciated that other methods of visual coding of cells may be employed by an electronic spreadsheet formed in accordance with the present invention (i.e., different shades, different shapes, etc.).

As previously mentioned, cells may contain not only objects but also formulas operative on those objects. Such formulas may have arguments which represent specific data or references to other cells. Accordingly, data and/or formulas may be entered into a cell by the user. The user can enter data into a cell by first selecting the desired cell. As previously discussed, this is accomplished by placing the display cursor over the cell and clicking the mouse. It is to be appreciated that each cell, in the cell field 102, may be individually selected in this manner. Once a cell is selected, the contents of that cell are displayed in text edit field 108. If no data or formula was previously associated with that particular cell, then nothing will appear in the text edit field 108. However, if the cell contained data or a formula, then such information will appear in the field and may be edited accordingly. Whether inputting data or formulas into a cell, or editing the contents of a cell, the user may do so by utilizing the keyboard and typing the desired information into the text edit field 108. Consequently, the new data or formula becomes associated with that particular selected cell.

The electronic spreadsheet of the present invention provides several other facilities to aid the user in inputting and editing objects and formulas associated with the cells, as well as accessing other useful functions of the spreadsheet. For instance, a function button field 110 may assist the user during his spreadsheet operations.

Function button field 110 provides, among other functions, user-selectable buttons that the electronic spreadsheet user may use in conjunction with the creation of formulas within the text edit field 108. For instance, in a preferred embodiment, operators and other symbols that can be used in a formula are illustrated on selectable buttons which the user can select and include in the formula that he is generating. Various common operators (i.e., +, −, ×, =, >, <, etc.) may be included in the function button field. Also, operators such as AND, OR, AVG and SUM are included in the function button field 110. Likewise, it is to be appreciated that certain application specific operators may also be included.

It should be understood that the functions associated with the electronic spreadsheet, as described above, are only representative of basic functions provided in a preferred embodiment. Thus, other functions may be implemented, and functions described above may be modified, while still allowing the electronic spreadsheet of the present invention to provide the unique functionality and capability described herein.

A simple example of the operation of the electronic spreadsheet of the present invention will now be discussed utilizing the visual presentation of FIG. 2. The electronic spreadsheet, in this example, is being used to perform two calculations on four sets of data. As previously explained, each cell in the cell field 102 is identified by a column/row reference designation (e.g., cell 103 is identified as A1). Thus hereinafter, reference to any particular cell within any particular cell field will be made with respect to its column/ row reference designation (e.g., A1, B1, C1, etc.). In this example, the cells in column A (A1, A2, A3 and A4) and the cells in column B (B1, B2, B3 and B4) contain objects. Column C contains cells which respectively represent the sum of a corresponding cell in column A and a corresponding cell in column B. On the other hand, column D contains cells which respectively represent the average between a corresponding cell in column A and a corresponding cell in column B.

Discussing each operation row by row, cell A1 and cell B1 contain simple scalar objects, which are the integers 3 and 5, respectively. Cell C1 contains a formula which represents the sum of cell A1 and cell B1 and thus, cell C1 displays the result associated with that formula, which is the integer 8. It is to be appreciated that this formula, as well as the formulas discussed herein, was entered into the cell in a manner in accordance with the present invention, as described herein. Next, cell D1 contains a formula which represents the average of cell A1 and cell B1 and, thus, cell D1 displays the result associated with that formula, which is the integer 4.

The next set of operations involve cell A2 and cell B2. Cell A2 and cell B2 each contain Timeseries. As previously discussed, a Timeseries is an object which includes data elements pertaining to, for instance, the selling price of a particular stock at various time periods, or an entire stock history. Thus, in accordance with the present invention, the electronic spreadsheet user may merely enter into a cell a name corresponding to a particular stock and, thereafter, all of the data elements which are associated with that name will be associated with that particular cell. In a preferred embodiment, the name that the user enters corresponds to a data file which contains the data elements associated with that object. Further, the data file may be stored in the memory storage unit 12 (FIG. 1) and retrieved as needed.

It is also to be appreciated that a real-time Timeseries can be similarly identified by a single name and thereby automatically associated with a cell. In such a case, the data elements of a real-time Timeseries are dynamically updated by a real-time data source, as opposed to the static nature of the Timeseries, and thus, the data associated with the cell is dynamically updated.

Cell A2 contains a Timeseries which includes the entire history of the price of stocks of Sun Microsystems (SUNW), while B2 contains a similar Timeseries for IBM. Further, cell C2 contains a formula which represents the sum of the values from cell A2 and cell B2, on dates which correspond in both Timeseries. Still further, cell D2 contains a formula which represents the average of the corresponding values of both Timeseries. It should be understood that the results of the evaluation of the formulas associated with cell C2 and cell D2 are not displayed in the cell; rather, only the formula is displayed. However, the resulting data, which are themselves Timeseries (therefore, cells C2 and D2 will be color coded accordingly), may be displayed in user-selectable visual formats such as, for example, a graph or a chart. Such alternative visual formats will be illustrated in a later example. Also, the format that the formulas in cell C2 and cell D2 are in (i.e., relative reference RC notation), will be explained later in a discussion of the internal implementation of the present invention.

The next set of operations illustrated in FIG. 2 involves an object type referred to as a list. A list is, itself, a collection of individual objects. Thus, cell A3 and cell B3 contain lists. The list in cell A3 includes a series of scalar values, 2, 4 and 6, while the list in cell B3 includes a similar series of scalar values, 7, 7 and 23. Further, cell C3 contains a list with each object in the list corresponding to the sum of similarly positioned objects in the lists of cell A3 and cell B3. Thus, cell C3 contains a list including the scalar values, 9 (2+7), 11 (4+7) and 29 (6+23). Correspondingly, cell D3 contains a list including the average of the similarly positioned objects of cell A3 and cell B3, that is, 4.5 ((2+7)/2), 5.5 ((4+7)/2) and 14.5 ((6+23)/2).

Lastly, the same sum and average operations are applied to cell A4 and cell B4. Cell A4 and cell B4 contain complex numbers. It is to be appreciated that such object types are not found in prior art electronic spreadsheets; however, the user of the electronic spreadsheet of the present invention may define unique objects such as these, as well as the particular operations that will be permitted to be performed upon them. The facility for generating such user-defined objects will be explained later in the discussion of the internal implementation of the present invention. Nonetheless, cell C3 contains the complex number, 3+5i, which is the result associated with the formula which summed the complex number in cell A4, 1+2i, with the complex number in cell B4, 2+3i. Further, the complex number, 1.5+2.5i in cell D4 is the result associated with the formula which averaged the complex numbers in cell A4 and cell B4.

Referring now to FIG. 3, another visual presentation associated with the electronic spreadsheet of the present invention is illustrated. Visual presentation 200, illustrated in FIG. 3, is similar to visual presentation 100 of FIG. 2; however, the visual presentation 200 illustrates two additional user-interactive fields which may be implemented by the electronic spreadsheet of the present invention. Specifically, query window field 202 and pull-down menu field 204 are illustrated in the visual presentation 200. Further, it is to be appreciated that fields in FIG. 3 which contain similar functions and/or information as those fields illustrated in FIG. 2, are assigned the same figure reference designation.

Accordingly, the query window field 202 contains a query window which provides the user with an additional facility to generate formulas, which also includes generating functions which operate on objects. Specifically, the user is presented with powerful pre-defined questions, in an English sentence style format, from which he can select desired pre-defined parameters and/or provide data himself In response, the query window processes the information and generates the desired formula. An example of the usage of the query window will follow. In a preferred embodiment, the user can toggle between displaying and not displaying the query window field 202 by clicking on a corresponding function button in the function button field 110.

Pull-down menu field 204 provides pull-down menus that contain commands and functions which further aid the user in the operation of the electronic spreadsheet. In a preferred embodiment, the pull-down menus include a file menu which allows the user to save the visual presentation which he is currently working on, as well as open and close similarly created visual presentations. The user may also print any particular visual presentation he has created.

Further, the pull-down menu field 204 includes an edit menu. The edit menu allows the user to select functions that permit him to delete, move, and/or copy selected cells to other cell locations. These functions may be performed on both individual cells and ranges of cells (i.e., contiguous groups of cells). It is to be appreciated that ranges of cells can be selected by depressing the mouse button while the display cursor is on a cell that will serve as the upper leftmost cell in the range and dragging the display cursor to another cell which will serve as the lower rightmost cell in the range.

Still further, a worksheet menu is provided in the pull-down menu field 204, which allows the user to manipulate the columns and rows that are displayed at any given time on the visual presentation. For example, the user may choose to display a particular row or column, even though the user also desires to scroll the cell field 102 to previously undisplayed areas of rows and columns. Likewise, the user may decide not to display a particular row or column even though it falls within the area of rows and columns currently displayed in the cell field 102.

The pull-down menu field 204 also provides a data menu. The data menu allows the user to select additional data manipulation functions such as searching and sorting. Specifically, the user is able to enter a particular data value and have the electronic spreadsheet search each object associated with a cell and then identify the cell that contains the object containing that particular data value. Also, the user may alphabetically sort the column containing the currently selected cell.

Lastly, the pull-down menu field 204 includes a window menu. The window menu allows the user to select functions that manipulate the attributes of the visual presentation. For instance, the user may set the color, font, border width and styles associated with the cells, as well as manipulate other attributes associated with the cell field 102 and the function button field 110.

An application specific example of the operation of the electronic spreadsheet of the present invention will now be discussed utilizing the visual presentation of FIG. 3. The present invention, in this example, is being used to set up an electronic spreadsheet that can monitor a portfolio of stocks. Specifically, cells A2 through A5 contain real-time Timeseries. As previously explained, these object types contain stock prices and are updated, in real-time, from a stock market data feed. Thus, cell A2 contains a real time Timeseries associated with IBM, cell A3 contains the same for Microsoft (MSFT), cell A4 contains the same for Sun Microsystems (SUNW) and cell A5 contains the same for Apple Computers (AAPL). Cell A1 functions as a title box in this example and merely denotes that the cells in column A represent stocks.

Cells B2 through B5 contain scalar values which represent the total number of shares of each stock that the electronic spreadsheet user owns. Accordingly, cells B2 through B5 indicate that the user respectively owns 100 shares of IBM stock, 85 shares of MSFT stock, 125 shares of SUNW stock and 200 shares of AAPL stock. Again, cell B1 functions as a title box denoting that the cells in column B represent the number of shares owned.

Cells C2 through C5 contain scalar values which represent the purchase price paid for each of the stocks. Cells C2 through C5 indicate that the user respectively paid $87.50 per share for IBM stock, $70.00 per share for MSFT stock, $63.40 per share for SUNW stock, and $44.00 per share for AAPL stock. Cell C1 functions as a title box denoting that cells in column C represent the purchase price paid.

Cells D2 through D5 contain scalar values which represent the latest price per share of each stock. Thus, the scalar values in each cell must be updated to indicate the latest price per share whenever the price per share changes in the real-time Timeseries contained in cells A2 through A5. In order to create a formula which will perform this function and, thus, respectively associate the result with cells D2 through D5, the user may utilize the query window located in query window field 202.

In a preferred embodiment, used in financial market analysis applications, the query window provides numerous queries (i.e., questions) to the user in an understandable, English sentence style syntax. For this particular application, the user may utilize the first query 202a (i.e., "The last Default value of {?}") to create the needed formula to be associated with each cell. Thus, the current price per share of IBM stock will be associated with cell D2 by selecting cell A2 (IBM) and then selecting the first query 202a. Similarly, by using the same technique, the current price per share of MSFT, SUNW and AAPL will be respectively associated with cells D3, D4 and D5. It is to be appreciated that the query window of the present invention may be tailored to a specific application whereby a specific query may be included in the query window which accepts user provided data inputs or permits selection of predefined parameters, in order to form a specific formula or provide a certain function. Again, cell D1 is merely a title box denoting that the cells in column D represent the last (i.e., latest) price per share of each stock.

Cells E2 through E5 contain scalar values which represent the individual net gain/loss associated with each stock. Cell E2 has a formula associated therewith whose result represents the difference between the scalar value in cell C2 and the scalar value in cell D2. As is evident, the resultant cell E2 will be updated each time the value in cell D2 changes. It is to be understood that the formula associated with cell D2 is re-evaluated each time one of its arguments changes, such as the value in cell D2. The same re-evaluation occurs with respect to the formulas in cells E3, E4 and E5, each time the values in cells D3, D4 and D5 respectively change. Thus, depending on what the latest price per share of a particular stock is, as compared to the purchase price, the cells in column E will indicate a gain (a value greater than zero), a loss (a value less than zero), or zero (if the price per share equals the purchase price). Again, cell E1 is merely a title box denoting that the cells in column E represent net gain/loss.

Lastly, cell E7 contains a scalar value which represents the result of a formula which sums cells E2 through E5. In fact, the formula itself is illustrated in text edit field 102 and is displayed merely by selecting cell E7. Again, it is evident that the value in cell E7 will change as the values in cells E2 through E5 change. Cell D7 is merely a title box denoting that cell E7 represents the total gain/loss associated with this stock portfolio.

Accordingly, by taking advantage of the unique features of an electronic spreadsheet formed in accordance with the present invention, a user may monitor the performance of his individual stocks or the total performance of the stock portfolio. It should be understood that while this example illustrates certain advantageous features of the electronic spreadsheet of the present invention, the example is a relatively simple example and more complex applications, in the financial market analysis area as well as other areas, are anticipated by the present invention.

Figure 4A:
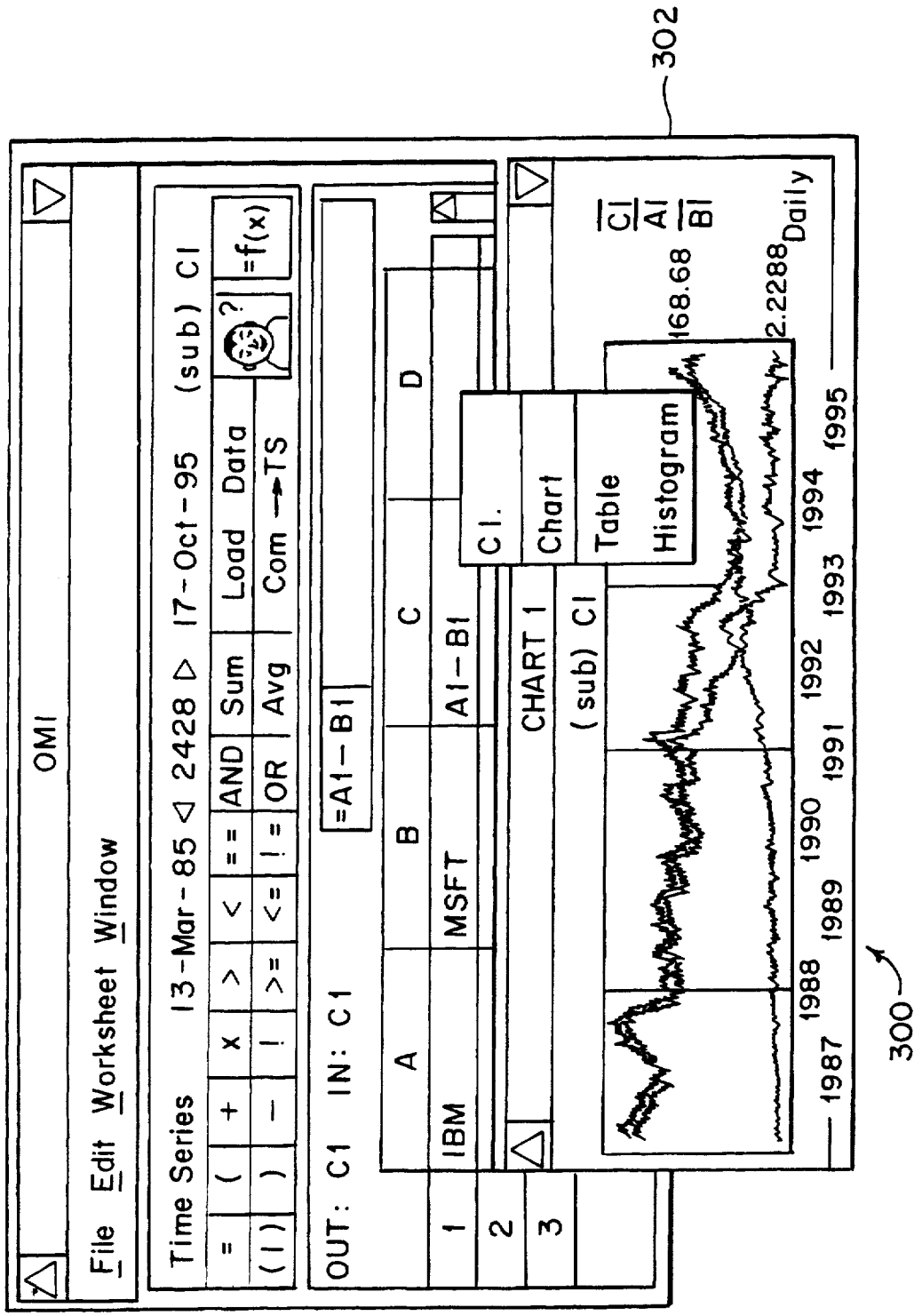
FIG. 4a is yet another embodiment of a visual presentation formed in accordance with the present invention.
Figure 4B:
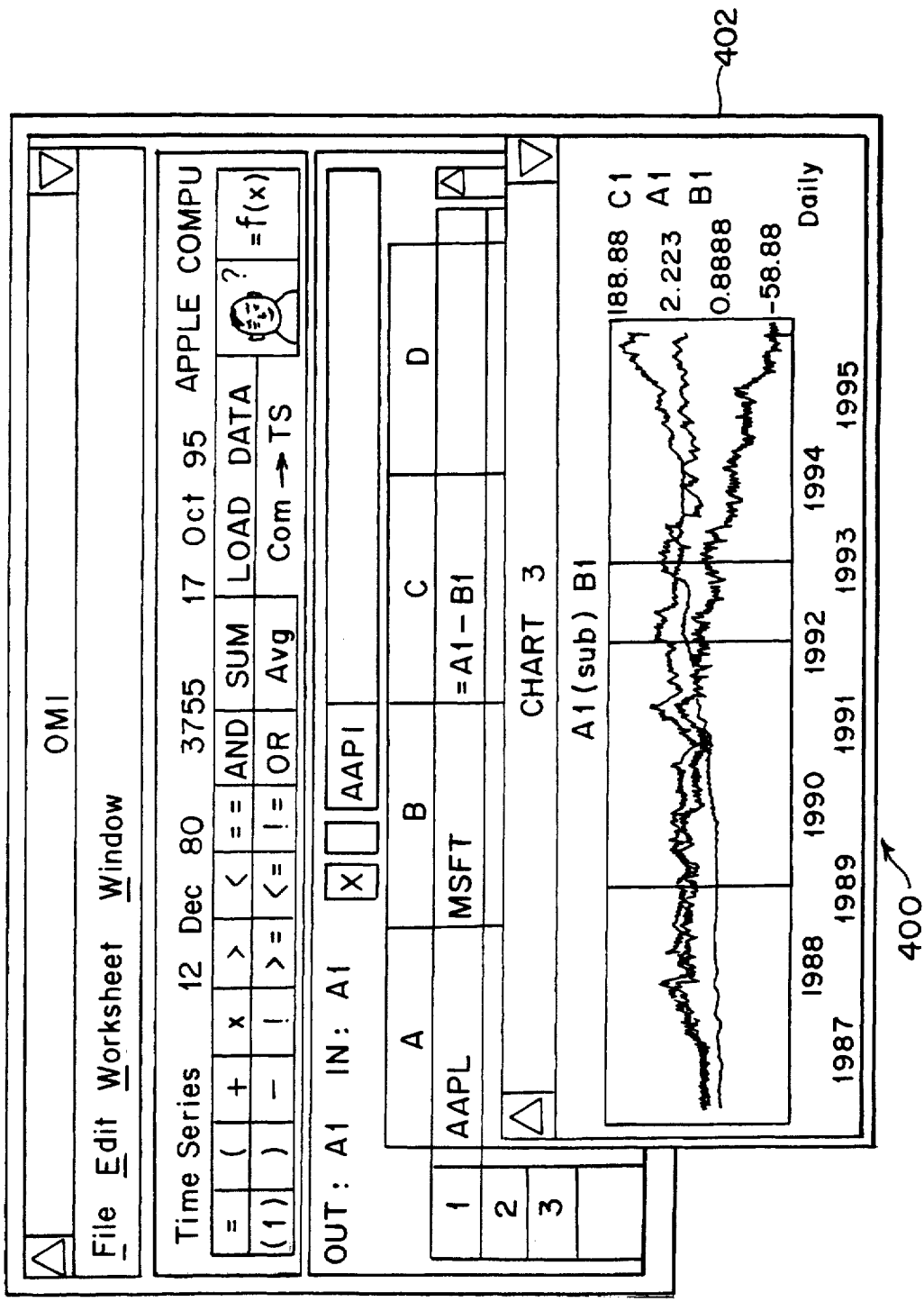
FIG. 4b is still a further embodiment of a visual presentation formed in accordance with the present invention.

Referring now to FIG. 4a and FIG. 4b, two other visual presentations associated with the electronic spreadsheet of the present invention are illustrated. First, with regard to FIG. 4a, visual presentation 300 illustrates the advantageous capability of the present invention to present data associated with objects in a user-selectable, useful visual format. Specifically, cell A1 contains a Timeseries (IBM), while cell B1 also contains a Timeseries (MSFT). Cell C1 contains a formula, the result of which itself is a Timeseries and which represents the difference between corresponding values of the two Timeseries in cells A1 and B1. In this example, the result in cell C1 is the difference in stock prices between IBM stock and MSFT stock on corresponding dates. Accordingly, visual format 302 illustrates a graphical plot of the data elements associated with each Timeseries in cells A1, B1 and C1. Thus, in general, the ability to select various visual formats gives the electronic spreadsheet user the ability to view complex objects, such as (but not limited to) Timeseries, in a very efficient and informative manner. It is to be appreciated that the electronic spreadsheet of the present invention provides the user with a choice of visual formats, depending on the object type, such as charts (as illustrated in FIG. 4a), tables, and histograms. In a preferred embodiment, the user is presented with a menu of visual format choices corresponding to each cell.

Next, referring to FIG. 4b, visual presentation 400 illustrates visual format 402 which is similar to visual format 302 (FIG. 4a). However, the visual presentation 400 of FIG. 4b is included to further illustrate the automatic reevaluation of cells provided by the present invention. Specifically, the Timeseries in cell A1 has been changed from a Timeseries representing IBM stock prices to a Timeseries representing AAPL stock prices. Cell B1 still contains a Timeseries representing MSFT stock prices, and cell C1 still contains a Timeseries representing the difference between the Timeseries of cells A1 and B1. Thus, by merely changing the name of the Timeseries in cell A1, cell C1 automatically yields the difference between AAPL stock prices and MSFT stock prices. Accordingly, the graphical plot in visual format 402 is updated to reflect the new Timeseries in cell A1 and the new resulting Timeseries in cell C1. It is to be appreciated that a similar result would occur if the objects associated with cells A1 and B1 were real-time Timeseries, that is, the visual format would be updated whenever a change occurred in the real-time Timeseries.

The following section of the detailed description discusses the internal implementation of the electronic spreadsheet of the present invention. It is to be appreciated that the electronic spreadsheet of the present invention is preferably essentially a software application program. Accordingly, the present invention is described in terms of its functional software components and the component's interrelationship with one another although a corresponding hardware implementation by one skilled in the art from that which is described is envisioned to be within the scope of the invention.

Figure 5:
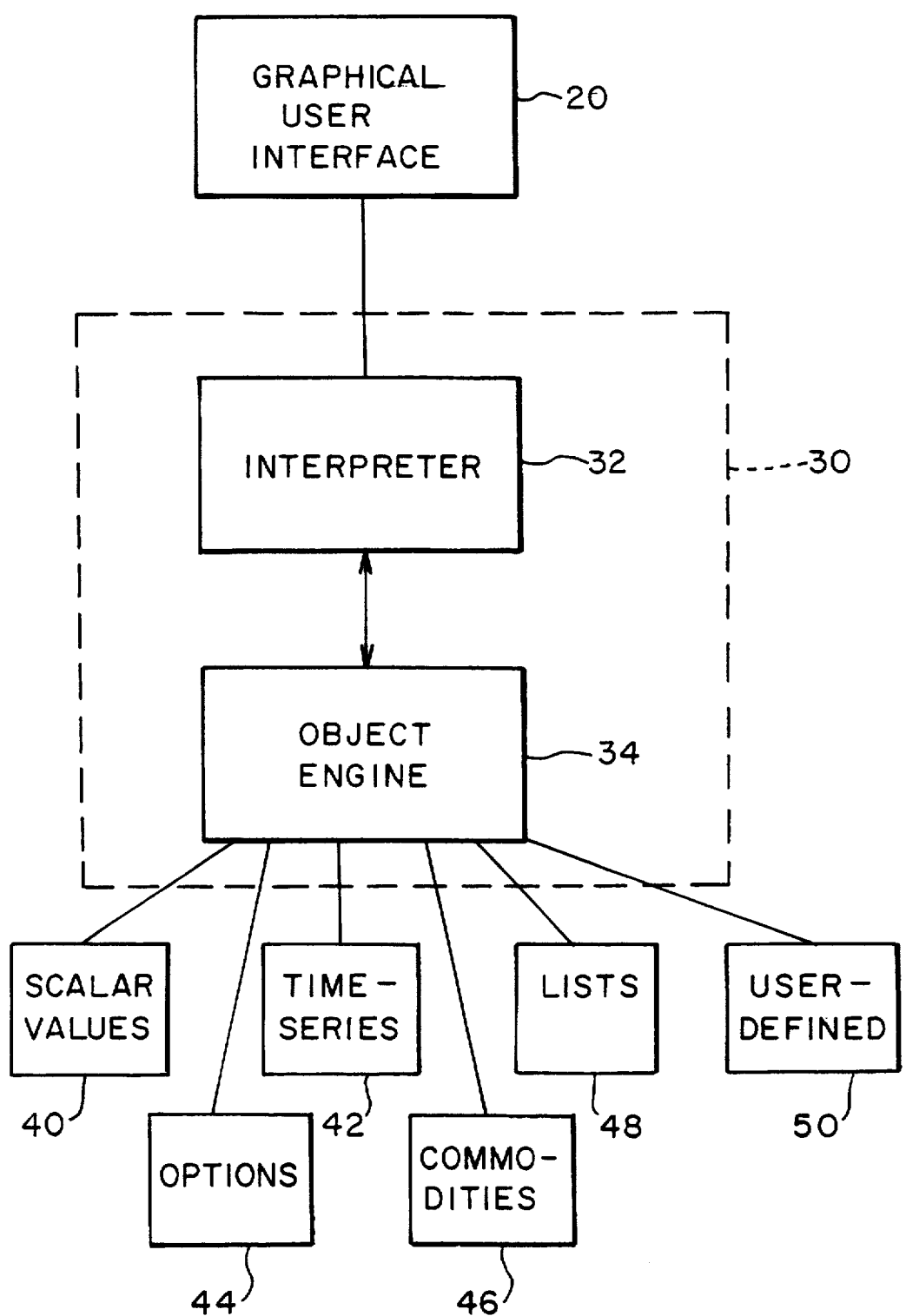
FIG. 5 is a simplified block diagram of the electronic spreadsheet formed in accordance with the present invention.

Referring now to FIG. 5, a block diagram of an electronic spreadsheet, formed in accordance with the present invention, is illustrated. Specifically, the electronic spreadsheet is composed of several functional software components including a graphical user interface 20, an interpreter 32 and an object engine 34. The interpreter 32 and the object engine 34 functionally combine to form a scripting language 30. A sampling of the object types which the present invention is capable of processing is also illustrated in FIG. 5. For instance, the electronic spreadsheet can process scalar values 40, Timeseries 42 (including real-time Timeseries), Options 44, Commodities 46, lists 48 and any user-defined objects 50.

In general, the graphical user interface 20 provides the visual presentation (FIGS. 2, 3, 4a and 4b) to the user and operates as a front-end to the scripting language 30. In other words, the graphical user interface 20 functions as a visual interface to the spreadsheet user and provides an access point to the powerful features of the scripting language of the present invention. The interpreter 32 functions as an interface between the graphical user interface 20 and the object engine 34. Stated differently, the graphical user interface 20 generates and submits commands and formulas through the interpreter 32 to the object engine 34. Consequently, the object engine 34 functions as the data calculation engine, that is, the software component that performs the cell operations associated with the electronic spreadsheet of the present invention. Accordingly, the object engine 34 receives instructions from the interpreter 32 and performs data calculations and manipulations in response to those instructions. Finally, the results are returned from the object engine 34, through the interpreter 32, to the graphical user interface 20 and, thus, ultimately to the electronic spreadsheet user.

In a preferred embodiment of the invention, the elements described in the preceding paragraph will be implemented as computer program code elements that are implemented in discrete computer systems linked together through computer network. In such an embodiment, a client computer system will include a graphical user interface 20 that provides a visual presentation (FIGS. 2, 3, 4a and 4b) to the user and operates as a means for directing the use of the data processing system. Data representing commands and formulas that is generated through use of the graphical user interface is transmitted through the computer network to one or more server computer systems that provide the functions of interpreting the commands and formula 32 and passing the interpreted data to the object engine 34 for processing. The interpreter 32 and object engine 34 may be components of a single server computer system or may be implemented in or as separate computer systems linked through a computer network.

One way to understand the operation of the present invention is through the features of the scripting language 30. The scripting language 30 is a full programming language with C-programming language type syntax. The language supports both simple and complex objects as well as formulas which are operative on these objects.

One of the key features which distinguish the electronic spreadsheet of the present invention from prior art electronic spreadsheets is the fact that the scripting language 30 supports polymorphic (i.e., overloaded) operators. This means that any operator may have several different operative expressions (i.e., functional meanings) assigned to it within the scripting language 30. The assignment of a particular operative expression to a particular operator depends on the object type of the object or objects being operated on. Thus, for example, a user may enter a formula into cell C1 which adds the values associated with cell A1 and cell B1. The operator used in this case would be the + operator. If both cells A1 and B1 contain integers, then the scripting language 30 recognizes these objects as scalar values and assigns the + operator to represent scalar value addition. However, if instead both cells A1 and B1 contain two separate stock history Timeseries, then the scripting language 30 recognizes these objects as Timeseries and assigns the + operator to represent an addition function which will add the values within the two Timeseries having corresponding dates. Still further, cell A1 may contain a scalar value, while cell B1 may contain a Timeseries. Again, the scripting language 30 recognizes each object type and, in this case, assigns the + operator to represent an addition function which adds the scalar element to each data value contained in the Timeseries.

As is evident from the examples above, polymorphic operators add a unique versatility to the electronic spreadsheet of the present invention. Also, as will be discussed later, the present invention not only permits the user to define new objects but also permits him to define new operations to be performed on these new objects through the use of existing operators. In fact, the user may also define new operators.

Another unique feature of the scripting language 30, as illustrated in the examples associated with FIG. 2 and FIG. 3, is that the scripting language can recognize an object (i.e., a Timeseries) merely by the name associated with that object (i.e., IBM). In a preferred embodiment, the name entered into the cell corresponds to a data filename. The filename is associated with a data file stored in a memory device, such as memory storage unit 18 (FIG. 1), and said memory device may be a component of the computer system upon which the invention has been implemented or a remote computer system accessible through a computer network. The present invention will retrieve the data file and automatically associate (i.e., load) the data contained therein with the cell containing the object name. Accordingly, formulas operative on that particular cell will thereby operate on the data elements associated with that cell.

A further advantageous feature of the scripting language 30 is its unique dataflow dependency capability. This dataflow dependency feature will be discussed in the context of a list which, as previously discussed, is an object which contains several other objects. The present invention represents a range of cells, and thus the objects contained therein, as a list.

For example, the range of cells A1 through A5 in the electronic spreadsheet is represented in the scripting language as a list of variables having a syntax: {A1,A2,A3,A4,A5}. It is to be appreciated that there is a special syntax for lists of references as opposed to lists of values. In most programming languages which implement lists, values are copied when inserted into the list. As an example, the following sequence illustrates this point:

$$A=2 \qquad [1]$$

$$B=3 \qquad [2]$$

$$C=\{A,B\} \qquad [3]$$

$$B=4 \qquad [4]$$

The syntax on line [3] sets C to a list containing A and B. Now, if B is changed, as it is on line [4], most programming languages would not support the operation which permits C to reflect the change in B. However, the scripting language 30 of the present invention does support such a feature, whereby list C has a reference to the variable B, such that the change will be reflected in the list. To accomplish this function, the scripting language of the present invention utilizes the syntax:

$$C=\{:A,B:\}$$

which instructs the interpreter to construct a list of references instead of values.

Thus, in accordance with the present invention, when a change occurs to a cell in the electronic spreadsheet, all cells which depend from that cell must be updated. This is referred to as dataflow dependency. The scripting language 30 of the present invention has special support for creating what are known as dataflow expressions. The scripting language 30 uses a special operator, :=, to designate a dataflow assignment. This := operator is to be distinguished from the standard, one time, assignment operator, =. As an example, the following expressions will illustrate this point:

$$X=Y+Z \qquad [1]$$

$$A1:=A2+A3$$

It should be understood that expression [1] simply assigns the sum of Y and Z to X at a point in time when this expression gets evaluated. However, expression [2] sets up a dataflow relationship. Specifically, expression [2] defines an implicit function which sums the values in A2 and A3 and sets up a relationship that will automatically trigger a call to that function whenever A2 or A3 change in value. This type of dataflow relationship is useful in updating changes which occur in cells that contain, for instance, real-time Timeseries or formulas operative upon such object types.

It is to be understood that the dataflow assignment operator, :=, is the unique feature which allows the scripting language 30 to provide the software function associated with the object engine 34. That is, scripting languages associated with prior art electronic spreadsheets do not support dataflow dependency in this manner and, thus, cannot function concurrently as data calculation engines.

Accordingly, combining this dataflow capability with the scripting language's support of lists, as described above, the present invention allows the user to generate simple, yet powerful formulas and functions. As an example, the user, utilizing formula entry methods previously discussed, may desire to sum the objects in cells A1 through A5 and assign the result to cell A6. The scripting language 30 supports this operation through the following expression:

$$A6:=Sum(\{:A1, A2, A3, A4, A5:\})$$

In this example, Sum( ) is a built-in function that operates on a list. The list, in this case, is a list of references to variables associated with cells A1 through A5. The use of the := operator transforms this expression into a dataflow operation. Thus, whenever any variable in cells A1 through A5 changes, the Sum( ) function is reevaluated, and the value in cell A6 accordingly updated to reflect the change. It should be appreciated that the variables in cells A1 through A5 can be any object type, including user-defined objects.

Figure 6:
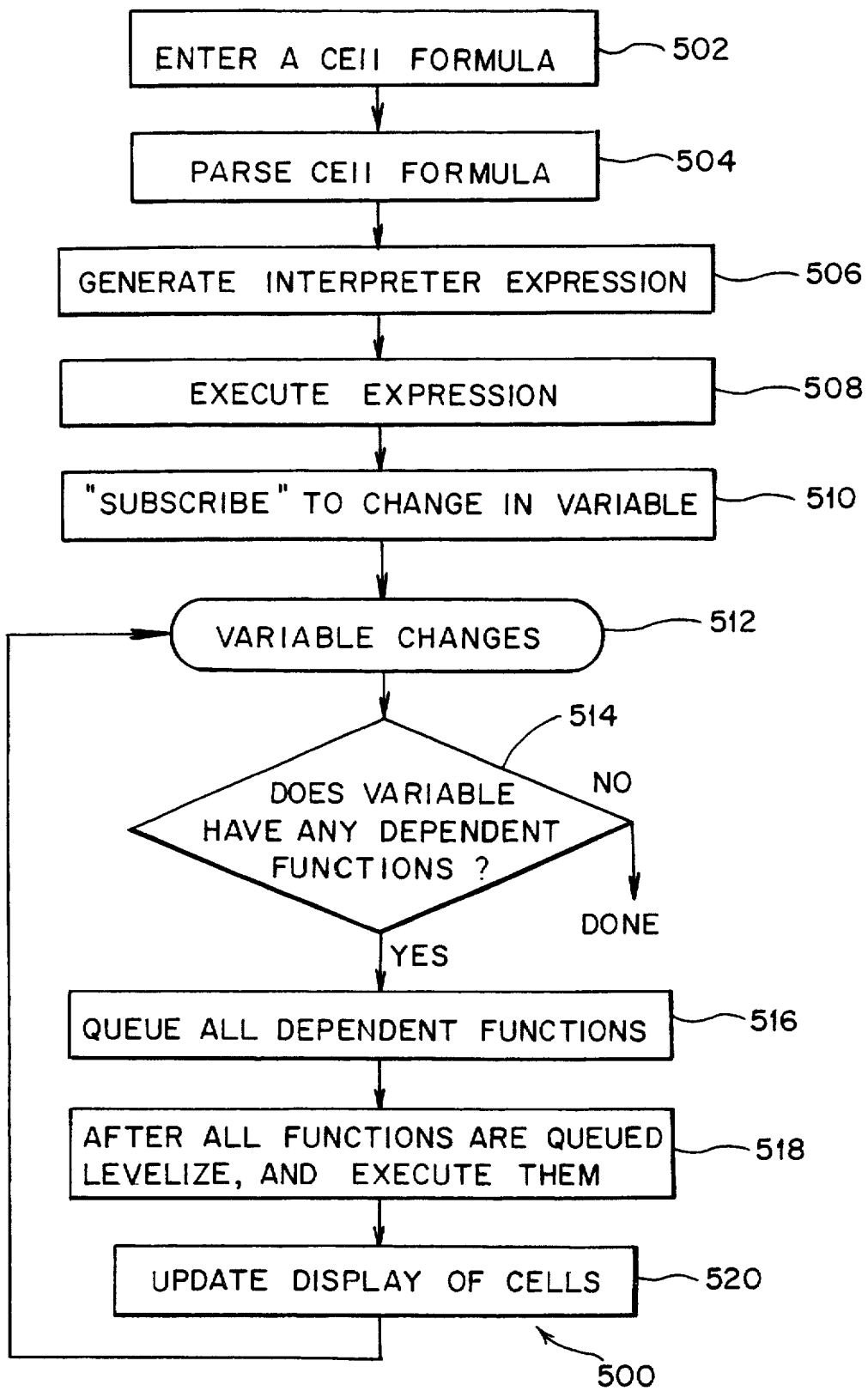
FIG. 6 is a flow chart depicting the interrelationship between the functional elements of the present invention.

Referring now to FIG. 6, a flow chart depicting the interrelationship between the graphical user interface 20 (FIG. 5), the interpreter 32 (FIG. 5) and the object engine 34 (FIG. 5), is illustrated. In a typical scenario, the electronic spreadsheet user generates a formula and assigns it to a cell (Block 502), for example, by entering the formula in the text edit field 108 (FIG. 3). For instance, the user may wish to add the value associated with the cell A1 to the value associated with cell B1, and assign the result to cell C1. After selecting cell C1, the user would enter the following formula in the text edit field 108:

$$=A1+B1$$

After the user enters this formula, the electronic spreadsheet scans, or parses (Block 504), the formula to determine if it is in the proper syntax and then the formula is translated into a form which the interpreter 32 is capable of processing (Block 506). First, the graphical user interface 20 scans the formula for any references which use a syntax such as $A$1. This syntax is considered a constant reference to the cell located at the intersection of the first column and the first row. This $A$1 syntax is different from the A1 syntax which denotes a reference which is considered to be relocatable such that, when a formula containing such a syntax is copied and assigned to another cell location, the reference will change to reflect the displacement in cells. The graphical user interface 20 translates references of the syntax $A$1 to the syntax A1 for purposes of evaluation, but changes the references to another syntax, that is, an RC notation (discussed below) for purposes of saving the formula in memory. Thus, when the formula is copied to another cell, the constant references will remain constant.

The RC notation is used to denote cell references relative to the cell in which the formula resides. For example, the reference R1C1 is a constant reference and refers to the cell located at the intersection of the first column and the first row. The RC notation also includes relative references. Relative references use a syntax such as R[1]C[−2] which, in this example, refers to a cell which is located, relative to the cell containing this reference, in the next numerically sequential row and two numerically sequential columns behind. The graphical user interface 20 translates all RC notation references to the standard A1 syntax for processing, but saves the references in their RC form such that when the references are copied, the relative references can be relocated.

As previously discussed, the present invention represents ranges of cells in a reference-list notation. The graphical user interface 20 allows the user to identify a range of cells by either entering an expression, in the form A1:A5 (i.e., representing the contiguous group of cells from A1 to A5), in the text edit field or by using the mouse to select a range of cells, whereby the expression is automatically entered. However, as previously explained, the scripting language does not support the A1:A5 notation directly. Therefore, the expression A1:A5 is translated into the reference-list notation {:A1, A2, A3, A4, A5:}. This expression is passed to the scripting language 30, through the interpreter 32, where the object engine 34 utilizes it to create the required dataflow dependencies.

Further, it is to be appreciated that the graphical user interface 20 supports several notational shortcuts for entering complex expressions. For example, by prefacing a formula with a "/", the formula is designated as a real-time formula. This notation is useful when designating such objects as real-time Timeseries. Additionally, the user may include other characters or symbols in the formula, referred to as directives, in order to instruct the present invention to perform certain functions. For instance, the user can insert directives into the formula to instruct the present invention to change the color of a cell or to dispatch a command to the interpreter without returning the command result to the cell.

Thus, returning to the example formula that the user entered into cell C1 (i.e., =A1+B1), the graphical user interface 20, in response, generates the expression:

C1:=A1+B1

This expression is then passed from the graphical user interface 20 to the interpreter 32. It is to be appreciated that, as previously mentioned, this expression which is generated from the formula entered by the user is saved by the present invention so that the formula can be copied or moved to another cell location.

Accordingly, once the expression is translated into the proper form and sent to the interpreter, the expression is evaluated, or executed (Block 508). It is to be appreciated that each cell maps into an interpreter variable. For example, cell A1 represents the variable A1. It is also to be appreciated that an expression containing the := operator, as the expression above contains, has special significance. The := operator (i.e., the dataflow expression operator) instructs the interpreter 32 to perform the steps illustrated in Blocks 510, 512, 514, 516, 518 and 520 of the flow chart of FIG. 6. Accordingly, the interpreter 32 dynamically builds an internal function which is associated with variable C1 and, along with the variables A1 and B1, is saved by the present invention. During this step, the interpreter 32 identifies the variables within the expression which are required by the internal function to calculate the final result (e.g., A1 and B1).

Next, the present invention monitors these variables for any change (Block 512). Whenever the value of any variable changes, the interpreter 32 creates a list of functions, the functions being previously created (Block 510), which are dependent upon the variable which changed. An internal command is queued, or initiated (Block 516) within the interpreter 32 to accordingly levelize (i.e., prioritize) and evaluate each function in the list (Block 518).

Finally, the appropriate cell in the visual presentation, generated by the graphical user interface 20, is asynchronously updated (Block 520) to reflect any change in the result associated with the user's original formula. In this way, only the small set of affected dependent functions and corresponding cells are updated whenever the value of a variable changes within the present invention. Advantageously, the entire electronic spreadsheet of the present invention need not be re-evaluated each time a change occurs; rather, only the minimum number of cells get re-evaluated and updated. Also, it is important to note that this re-evaluation and update is automatically performed by the present invention and, thus, the user need not perform any additional steps, after creating the desired visual presentation, to keep the visual presentation updated with current data.

While, in a preferred embodiment, the user of the present invention can access both simple and complex object types, the user is also given the capability of extending the types of objects which the present invention can process and thus he can access. With this capability, the user can create a new object type and define the operators and functions which will be operative on that new object type. In this way, the interpreter will recognize the new object type as it readily recognizes the previously existing object types.

Referring now to FIG. 7a and FIG. 7b, a source code file and a script file associated with the creation of the user-defined complex number objects illustrated in FIG. 2 are respectively illustrated. In accordance with the present invention, the user creates the new object type (i.e., complex numbers) in the following manner. The user, utilizing the facilities of the present invention, prepares two software files. The first file, as illustrated in source code format in FIG. 7a, defines the new object and the operations which are permitted to be performed thereupon. The user programs the first file in a C-programming language-type syntax and compiles the file through a C or C++ compiler. Next, the user prepares a short script file, as illustrated in FIG. 7b, which serves to load the compiled version of the first file into the object engine 34 of the present invention. In this way, the object engine 34 can perform the defined operations on the new object type once called upon to do so by the user through the graphical user interface 20.

In another preferred embodiment of the invention, the data-processing system described herein is implemented using the Java programming environment or paradigm. The Java programming paradigm environment is a platform-independent abstracted computing model that permits one to create executable program code that is capable of running on a variety of operating systems. See, for example, U.S. Pat. No. 5,748,964 and 5,740,4415. Information documenting both the Java programming language and the Java computing environment is readily available through the Internet (http://www.sun.com/java) and through publications such as Java Programming Environment, Sun Microsystems; *Java In a Nutshell*, David Flanagan, O'Reilly & Associates.

One of the principal benefits of implementing the invention using the Java programming language is that it permits easy creation and deployment of distributed computing systems through its integration of networking capabilities and its distributed class structure.

In the Java implementation of the present invention, discrete sets of functional components of the invention are incorporated into Java classes that can be loaded and executed by any computer system that supports the Java environment. This can be done via a world-wide web browser (e.g., Netscape Navigator or Internet Explorer) that supports Java, or through direct calls to an operating system that has been Java-enabled. Thus, discrete sets of Java classes provide the same functionality of the various means described above, including visual presentation displaying means 70, object and formula associating means 72, formula scanning means 74, formula evaluating means 76, result associating means 78, storing means 80, instructing means 82, and visual format displaying means 84.

Implementation of the invention in the Java environment also encompasses enabling the invention to support direct calls to Java objects from within the native non-Java environment embodiment of the present invention, including through calls executed through the scripting language of the present invention. Thus, the object and formula associating means 72, the scanning means 74 and the formula evaluating means 76 each or collectively can be implemented so as to be able to invoke methods associated with a Java object or integrated in the Java environment through interfaces to such objects or to such an environment. This can be done either by writing software code to effect the present invention in the Java programming language, or by supporting a minimal set of features of the Java programming model to enable the present invention to operate in said environment.

Another significant benefit to implementing the present invention in the Java environment relates to the ability of the invention to recognize new data objects, particularly objects implemented and made available through the Java environment. Thus, the instructing means 82 of the present invention can be effected through calls to data objects made available through the Java environment.

The following example illustrates how a data object made accessible through the Java programming environment would be implemented. For the purposes of this example, assume that discrete cells in the visual presentation means 70 can contain references to Java objects. These objects could be local or remote objects. An example of a local object would be a string.

A1: new String("hello world")
A2: A1.length( )
A3: A2+1

In the example above, the code in cell A1 creates a new Java string with the contents "hello world". Cell A2 then uses the length( ) method of the Java string class to compute the length of that string. The result of cell A2 would be, in this case, 11. Then, cell A3 simply adds 1 to that value to produce 12. This type of calculation is typically performed by a programmer; however, using the invention, it can be done by a spreadsheet user.

Another example involves manipulation of a remote object via the Java environment. In this example, the method for manipulating or accessing the remote data object is the Java Remote Method Interface (RMI). Information describing the Java RMI is available through http://www.javasoft.com/products/idk/rmi/index.html. In the current example, a "Naming.lookup" method call in the Java syntax is made within a cell to obtain a reference to a remote object running on a remote server. This example assumes the existence of a remote object on a remote system called "PriceServer". The remote object has a method called "getPrice(<stock name>)" that returns the current price of that stock. According to the present invention, cells containing a representation of the remote object are described as follows:

A1: Naming.lookup("rmi://localhost/PriceServer")
A2: Naming.lookup("rmi://remotehost/PriceServer")
A3: A1.getPrice("IBM")
A4: A2.getPrice("IBM")
A5: A2–A3

The example above would involve the system, upon which the present invention is implemented, being connected to two servers and obtaining object references. These two object references would, for the PriceServer, be linked through remote object reference representations running on them into in cells A1 and A2. Cells A3 and A4 respectively call the "getPrice" method on those two object references. These two methods are actually executed on different machines and may obtain different results. Cell A5 then shows the difference between the prices obtained from the two sources. The present invention would be able to perform the necessary operations on these discrete objects notwithstanding the fact that they were previously not defined within the scripting or evaluation means of the present invention, or even known to the application when it runs. Thus, the data processing system is only aware of the remote object through a local proxy created by the Java RMI system. This demonstrates that the present invention can manipulate objects that reside in servers that are located in a separate machine.

It is to be appreciated that the load command on the first line of the script file, illustrated in FIG. 7b, is the only command necessary to load and make the new complex number object type available to the user. The remaining lines of the script file demonstrate another unique feature of the electronic spreadsheet of the present invention. Specifically, the present invention allows the user to create a script file, such as that illustrated in the remaining lines of FIG. 7b, which will automatically enter an object, or a formula, or a set of formulas, or even an entire definition of a cell field into a visual presentation which the user wishes to view. Thus, the remaining lines of the script file illustrated in FIG. 7b will automatically load the newly defined complex numbers into cells A1, B1 and C1 and automatically associate the result of various different operations performed on those cells with the corresponding cells containing the operative formulas.

A computer program of the operation of the electronic spreadsheet in accordance with the present invention is provided herewith and is incorporated herein as part of the disclosure of the invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computer-based data processing system suitable for performing analytical operations on complex data objects, said system being extensible to recognize and operate upon new data object types, said system comprising:

visual presentation display means for displaying a visual presentation to a user, the visual presentation including:

at least one cell matrix including columns, rows and cells, the cells being formed at intersections of the columns and the rows, wherein at least one cell contains a representation of a complex data object comprising reference information to data maintained in a data structure defined in an external computer system, said reference information incorporating characteristics of said externally stored data to enable the data processing system to perform operations on the complex data object; and at least one text edit field capable of receiving information pertaining to objects and formulas entered by a user through input means;

first associating means for associating objects represented by a cell in the visual presentation and formulas received from a user with said cell;

scanning means for scanning a formula and an object associated with said formula by the first associating means, said scanning means defining permissible operators that may be applied to said object by said formula, said scanning means ensuring that the formula conforms to a preferred cell reference syntax, said scanning means translating each formula not in conformity with such syntax into the preferred cell reference syntax so that the formula can be processed by the system;

evaluating means for evaluating each formula associated with an object, wherein said evaluating means assigns a functional meaning to the operators in each formula in accordance with the object type of the object being operated upon by each formula, wherein at least one such operator is a polymorphic operator capable of assigning different functional meanings contingent on the type of data object being evaluated, said evaluating means further comprising:

means for re-evaluating each formula if a value within the at least one object changes; and means for re-associating the result of each formula with each cell containing each formula operating on the at least one object whose value has changed;

second associating means for associating a result produced by said evaluating means with each cell associated with each formula operating on the at least one object;

representation producing means for producing at least one visual representation of at least one result produced by the evaluating means, said at least one visual representation being selectable by the user; and instructing means for instructing the system to recognize new objects and new operators defined by a user.

2. A computer-based system as defined in claim 1, wherein the visual presentation further includes:

a query window, the query window receiving user-provided responses corresponding to English sentence-style pre-defined questions, the query window forming a formula in accordance therewith that is entered into the system through the at least one text edit field; and a user-selected cell, the first associating means associating the formula formed by the query window with the user-selected cell, the evaluating means evaluating the formula and the second associating means associating a result of the formula with the user-selected cell.

3. A computer-based system as defined in claim 1, wherein each cell has a different visual appearance depending on the object type of each object associated therewith.

4. A computer-based system as defined in claim 1, wherein the instructing means comprises a computer programming language having a syntax selected from the group consisting of a C-programming language, a Java programming language and a Ranger scripting language.

5. A computer-based system as defined in claim 1, wherein the instructing means comprises an external object library.

6. A computer-based system as defined in claim 5, wherein the external object library is a Java class library.

7. A computer-based system as defined in claim 1, wherein the user identifies a user-selected cell through the input means and enters at least one character into the at least one text edit field through the input means, the system further comprising:

a memory storage unit, the memory storage unit being responsive to the first and second associating means and the evaluating means and containing signals corresponding to data associated with the object; and means for correlating the at least one character with the data associated with the object and thereby associating the data with the user-selected cell.

8. A computer-based system defined in claim 1, wherein the system is deployed in a client-server computing environment, said environment comprising at least one client computer system operably linked through a computer network to at least one server computer system.

9. A computer-based system defined in claim 8, wherein the computer network is selected from the group consisting of a local area network, a wide-area network and the Internet.

10. A computer-based system as defined in claim 8, wherein the visual presentation means are implemented on the at least one client computer system.

11. A computer-based system as defined in claim 8, wherein the first and second associating means and the evaluating means are implemented on the at least one server computer system, and wherein the scanning means, the visual presentation display means, the instructing means and the respresentation producing means are implemented on the at least one client computer system.

12. A computer-based system as defined in claim 1, wherein the means comprises a computer memory in combination with computer program code.

13. A computer-based system as defined in claim 12, wherein the computer program code is selected from the group consisting of a C++ library and a Java class library.

14. A computer-based system as defined in claim 12, wherein each of the visual presentation means, the first and second associating means, the evaluating means, the representation producing means and the instructing means are implemented in a distinct Java class library.

15. A computer-based system as defined in claim 1, wherein the complex data object comprises a representation of a financial instrument.

16. A computer-based system as defined in claim 15, wherein the complex data object comprises a representation of an historical value of the financial instrument.

17. A computer-based system as defined in claim 16, wherein the complex data object comprises a representation of a financial Timeseries valuation of the financial instrument, and includes values corresponding to the date, time and sales price of said financial instrument.

18. A computer-based system as defined in claim 17, wherein the financial Timeseries values are updated on an ongoing basis through retrieval of data from an external source through a computer network.

19. A computer-based system as defined in claim 1, wherein the complex data object comprises reference information that enables the computer-based system to retrieve data from a remote computer system operably linked to the computer-based system through a computer network, said reference information being interpreted by the scanning means to evaluate the value of said reference information prior to being evaluated by the evaluating means.

20. A computer-based system as defined in claim 1, wherein the visual representation comprises:
at least one complex data object representing a variable capable of holding a scalar value; and
at least one complex data object representing a function within the lexicon of a scripting language supported by the scanning means and the evaluating means.

21. A computer-based system as defined in claim 20, wherein the first formula scanning means generates values comprising initiation of procedures executed on a remote computer system operably linked to the computer-based system through a computer network.

22. A computer-readable medium comprising computer program code, wherein said computer program code, in combination with a computer system, produces a data processing system as defined in claims 1, 2, 3, 4, 5, 6, 7, 8, 9, 10, 11, 12, 13, 14, 15, 16, 17, 18, 19, 20, or 21.

23. A method of data processing, utilizing a computer-based system, said system being suitable for performing analytical operations on complex data objects and being extensible to recognize and operate upon new data object types, the method comprising the steps of:
displaying a visual presentation to a user, the visual presentation including at least one matrix, the at least one matrix including columns, rows and cells, the cells being formed at intersections of the columns and the rows, each cell representing an object, at least one cell representing a complex data object, said complex data object corresponding to a representation in data of characteristics of a financial instrument;
associating objects and formulas with the cells, each object having an object type, each formula receiving at least one object as an argument, each formula having at least one operator for operating on the at least one object received as the argument, at least one formula being polymorphic in relation to its ability to perform operations on an object based on the characteristics of said object;
evaluating each formula, the evaluating step including assigning to the at least one operator in each formula one of a plurality of operative expressions selected in accordance with the object type of the at least one object received as the argument of each formula, said evaluating step further including the step of re-evaluating each formula if a value within the at least one object is changed; and
associating a result, obtained during the evaluating step, with each cell associated with each formula operating on the at least one object.

24. A method of data processing as defined in claim 23, wherein the step of associating objects and formulas with the cells includes generating each formula from a user-interactive English sentence query window, the query window receiving user-provided responses corresponding to pre-defined questions, the query window processing the responses received in response to the questions, the query window generating a formula in accordance therewith.

25. A method of data processing as defined in claim 23, further comprising the step of scanning each formula to ensure that each formula conforms to a preferred cell reference syntax processable by the system, the scanning step also translating each formula, not in conformity with the preferred cell reference syntax, to the preferred cell reference syntax.

26. A method of data processing as defined in claim 23, further comprising the step of producing a visually formatted representation of the result generated by the evaluating step, said visually formatted representation being displayed to a user, said visually formatted representation being selected by the user from a defined list of choices of visual formats.

27. A method of data processing as defined in claim 23 further comprising the step of distinguishing the cells by having each cell exhibit a different visual appearance depending on the object type of each object associated therewith.

28. A method of data processing as defined in claim 27, wherein the different visual appearance includes a difference in color.

29. A method of data processing as defined in claim 23 wherein the step of associating objects and formulas with the cells includes loading data from a memory storage unit, the data being associated with an object.

30. A method of data processing as defined in claim 23 further comprising the step of storing each object and each formula associated with each cell.

31. A method of data processing as defined in claim 23 further comprising the step of instructing the system to recognize new objects and new operators.

32. A method of data processing as defined in claim 31, wherein the instructing step is performed by user-programming.

33. A method of data processing as defined in claim 32, wherein the user-programming of the instructing step is performed using a programming language syntax selected from the group consisting of a C-programming language, a Java programming language and a scripting language.

34. A method of data processing as defined in claim 31, wherein the instructing step is further performed by instructing the system to recognize new objects selectable from an external object library.

35. A method of data processing as defined in claim 34, wherein the external object library is selected from the group consisting of a Java class library and a C++ class library.

36. A method of data processing as defined in claim 23 wherein the complex data object comprises a financial Timeseries valuation of a financial instrument and includes values corresponding to the date, time and sales price of said financial instrument.

37. A method of data processing as defined in claim 36, wherein the Timeseries values are updated on an ongoing basis through retrieval of data from an external source through a computer network.

38. A method of data processing as defined in claim 23 wherein the data processing method is implemented through a plurality of computers configured in a client-server computing environment, said client-server computing environment comprising at least one client computer system operably linked through a computer network to at least one server computer system.

39. A method of data processing as defined in claim 38, wherein the at least one client computer system and the at least one server computer system are operably linked through a computer network selected from the group consisting of a local area network, a wide-area network and the Internet.

40. A method of data processing as defined in claim 23 wherein the computer-based system is implemented in a client-server computing environment, and where the step of displaying a visual presentation to the user is performed by a client computer system.

* * * * *